United States Patent
Gundavelli et al.

(10) Patent No.: US 11,659,365 B2
(45) Date of Patent: May 23, 2023

(54) PROVIDING RADIO RESOURCE OWNERSHIP INDICATORS FOR USER EQUIPMENT CHARGING RECORDS IN A MOBILE NETWORK ENVIRONMENT

(71) Applicant: Cisco Technology, Inc., San Jose, CA (US)

(72) Inventors: Srinath Gundavelli, San Jose, CA (US); Vimal Srivastava, Bangalore (IN); Timothy Peter Stammers, Raleigh, NC (US); Mark Grayson, Berkshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 4 days.

(21) Appl. No.: 17/481,926

(22) Filed: Sep. 22, 2021

(65) Prior Publication Data
US 2023/0092940 A1    Mar. 23, 2023

(51) Int. Cl.
*H04W 4/00*     (2018.01)
*H04W 4/24*     (2018.01)
(Continued)

(52) U.S. Cl.
CPC ............ *H04W 4/24* (2013.01); *H04M 15/41* (2013.01); *H04M 15/8228* (2013.01); *H04W 16/02* (2013.01); *H04W 24/10* (2013.01)

(58) Field of Classification Search
CPC ....... H04W 4/24; H04W 16/02; H04W 24/10; H04M 15/41; H04M 15/8228
See application file for complete search history.

(56) References Cited

U.S. PATENT DOCUMENTS 11,496,628 B2 *  11/2022  Bhoria .................. H04M 15/66
2015/0201088 A1 *  7/2015  Wu ......................... H04W 4/24
                                                         455/406
(Continued)

FOREIGN PATENT DOCUMENTS

WO     2020205725 A1    10/2020
WO     2021065804 A1     4/2021

OTHER PUBLICATIONS

3GPP, "3rd Generation Partnership Project; Technical Specification Group Radio Access Network; NG-RAN; PDU Session User Plane Protocol (Release 16)," 3GPP TS 38.415 V16.5.0, Jul. 2021, 17 pages.

(Continued)

*Primary Examiner* — Pakee Fang
(74) *Attorney, Agent, or Firm* — Edell, Shapiro & Finnan, LLC

(57) ABSTRACT

Techniques are described herein for providing radio resource ownership indicators in charging records for a charging function. In one example, a method may include determining, by a session management node of a mobile network, that a user equipment is utilizing a particular radio resource of a mobile network resource for a Protocol Data Unit (PDU) session of the user equipment, wherein the mobile network resource is capable of being utilized via a plurality of radio resources and the particular radio resources is associated with an enterprise entity; and reporting charging information for the PDU session of the user equipment to a charging function of the mobile network to facilitate storing a charging record for the user equipment that is to include an identifier of the enterprise entity that is associated with the particular radio resource.

19 Claims, 13 Drawing Sheets

(51) Int. Cl.
    *H04W 16/02*     (2009.01)
    *H04M 15/00*     (2006.01)
    *H04W 24/10*     (2009.01)

(56) References Cited

U.S. PATENT DOCUMENTS

| | | | |
|---|---|---|---|
| 2020/0092424 | A1 | 3/2020 | Qiao et al. |
| 2021/0075915 | A1* | 3/2021 | Qiao ................. H04W 80/10 |
| 2021/0099909 | A1 | 4/2021 | Nithiyanantham et al. |
| 2022/0150740 | A1* | 5/2022 | Yao ................. H04W 76/10 |

OTHER PUBLICATIONS

3GPP, "3rd Generation Partnership Project; Technical Specification Group Services and System Aspects; Study on Enhanced Access to and Support of Network Slice (Release 18)," 3GPP TR 22.835 V0.2.0, Nov. 2020, 36 pages.

ETSI, "ETSI object identifier tree; Rules and registration procedures," Final draft ETSI EG 200 351 V4.1.1, Aug. 2001, 10 pages.

3GPP, "3rd Generation Partnership Project; Technical Specification Group Radio Access Network; NG-RAN; NG Application Protocol (NGAP) (Release 16)," 3GPP TS 38.413 V16.6.0, Jul. 2021, 473 pages.

3GPP, "3rd Generation Partnership Project; Technical Specification Group Radio Access Network; NR; User Equipment (UE) radio transmission and reception; Part 1: Range 1 Standalone (Release 17)," 3GPP TS 38.101-1 V17.2.0, Jun. 2021, 536 pages.

3GPP, 3rd Generation Partnership Project; Technical Specification Group Services and System Aspects; Telecommunication management; Charging management; Diameter charging applications (Release 16), 3GPP TS 32.299 V16.2.0, Dec. 2019, 207 pages.

3GPP, "3rd Generation Partnership Project; Technical Specification Group Services and System Aspects; Telecommunication management; Charging management; 5G data connectivity domain charging; stage 2 (Release 17)," 3GPP TS 32.255 V17.2.0, Jun. 2021, 129 pages.

3GPP, "3rd Generation Partnership Project; Technical Specification Group Services and System Aspects; Telecommunication management; Charging management; Charging architecture and principles (Release 17)," 3GPP TS 32.240 V17.2.0, Jun. 2021, 61 pages.

3GPP, "3rd Generation Partnership Project; Technical Specification Group Core Network and Terminals; 5G System; Session Management Services; Stage 3 (Release 17)," 3GPP TS 29.502 V17.1.0, Jun. 2021, 299 pages.

3GPP, "3rd Generation Partnership Project; Technical Specification Group Core Network and Terminals; General Packet Radio System (GPRS) Tunnelling Protocol User Plane (GTPv1-U) (Release 17)," 3GPP TS 29.281 V17.0.0, Mar. 2021, 34 pages.

3GPP, "3rd Generation Partnership Project; Technical Specification Group Services and System Aspects; Study on Enhanced Access to and Support of Network Slice (Release 18)," 3GPP TR 22.835 V18.1.0, Jun. 2021, 38 pages.

"5G NR QoS Architecture, QoS Attribute and QoS Flow," TechPlayOn, https://www.techplayon.com/5g-nr-qos-architecture-qos-attribute-and-qos-flow/, Sep. 28, 2020, 10 pages.

3GPP, "3rd Generation Partnership Project; Technical Specification Group Core Network and Terminals; Interface between the Control Plane and the User Plane Nodes; Stage 3 (Release 17)," 3GPP TS 29.244 V17.1.0, Jun. 2021, 345 pages.

3GPP, "3rd Generation Partnership Project; Technical Specification Group Core Network and Terminals; Policy and Charging Control (PCC); Reference points (Release 17)," 3GPP TS 29.212 V17.0.0, Jun. 2021, 289 pages.

3GPP, "3rd Generation Partnership Project; Technical Specification Group Services and System Aspects; Procedures for the 5G System (5GS); Stage 2 (Release 17)," 3GPP TS 23.502 V17.1.0, Jun. 2021, 692 pages.

3GPP, "3rd Generation Partnership Project; Technical Specification Group Services and System Aspects; System architecture for the 5G System (5GS); Stage 2 (Release 17)," 3GPP TS 23.501 V17.1.1, Jun. 2021, 526 pages.

"5G Frequency bands: Spectrum Allocations for Next-Gen LTE," CableFree, https://www.cablefree.net/wirelesstechnology/4glte/5g-frequency-bands-lte/, retrieved Aug. 30, 2021, 8 pages.

\* cited by examiner

PROVIDING RADIO RESOURCE OWNERSHIP INDICATORS FOR USER EQUIPMENT CHARGING RECORDS IN A MOBILE NETWORK ENVIRONMENT

TECHNICAL FIELD

The present disclosure relates to network equipment and services.

BACKGROUND

Networking architectures have grown increasingly complex in communications environments, particularly mobile networking environments. In some instances, a user equipment may desire to attach to a particular network slice in order to access services provided by the slice. Thus, a mobile network in which multiple slices may be available to a user equipment may enable enhanced services to be provided to the user equipment via one or more slices. However, there significant challenges with managing slices in a mobile network environment.

DESCRIPTION OF EXAMPLE EMBODIMENTS

Overview

Figure 1:
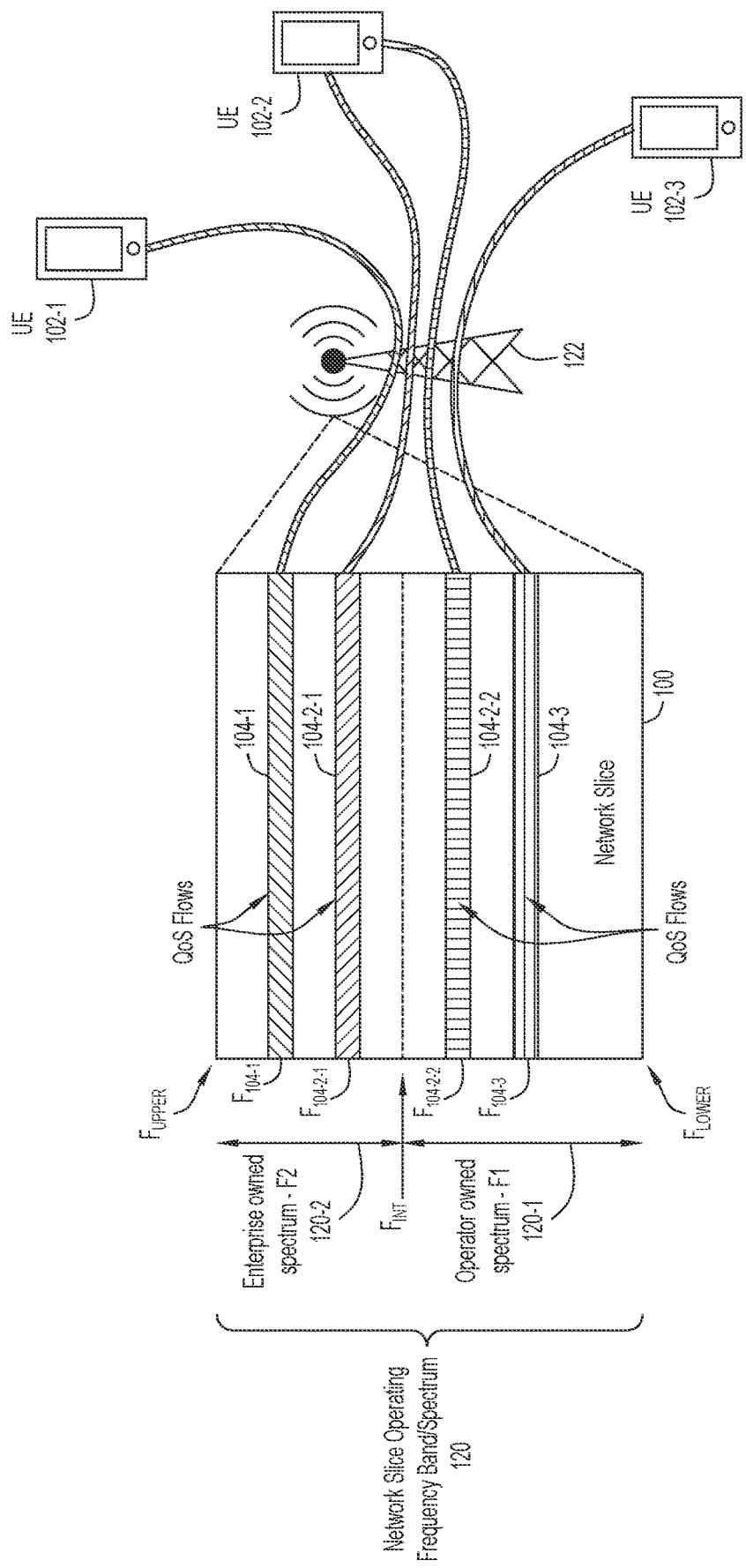
FIG. 1 illustrates example details regarding different frequencies that may be associated with a given network slice, in accordance with embodiments herein.

Techniques described herein provide for the ability to incorporate radio spectrum ownership indicators in the charging records for scenarios in which spectrum is owned by any of a customer, an enterprise entity, an operator, or a third-party.

In one embodiment, a method may include determining, by a session management node of a mobile network, that a user equipment is utilizing a particular radio resource of a mobile network resource for a Protocol Data Unit (PDU) session of the user equipment, wherein the mobile network resource is capable of being utilized via a plurality of radio resources and the particular radio resources is associated with an enterprise entity; and reporting charging information for the PDU session of the user equipment to a charging function of the mobile network to facilitate storing a charging record for the user equipment that is to include an identifier of the enterprise entity that is associated with the particular radio resource.

EXAMPLE EMBODIMENTS

As referred to herein, an 'enterprise' or 'enterprise entity' may be considered to be a business, government, educational institution, an organization, and/or the like that may include multiple enterprise locations (or sites), such as a main campus, remote branches, any operating environment of private Fifth Generation (5G), such as a factory floor, port, mining facility, electric grid, etc. and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for enterprise users associated with one or more UE, and/or the like).

Further as referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger, for example, up to a ratio of 1:5, depending on spectrum and power regulations) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers, enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) or a Public Network Integrated Non-Public Network (PNI-NPN) in some instances. Cisco is a registered trademark of Cisco Technology, Inc.

Various examples discussed herein may reference a network slice. Generally, a network slice also referred to generally as a 'slice' or can refer to a group or set of Virtualized Network Functions (VNFs) that are configured to facilitate a certain mobile network service or group of mobile network services.

Different types of slices (slice types) can be configured for a mobile network such that each slice type can provide certain mobile network services. As referred to herein and in the claims, the terms 'slice' and 'slice instance' may be used interchangeably to refer to slice type that is instantiated (e.g., configured, created, operated, etc.) to provide one or more mobile network services for one or more user equipment (UE). Various VNFs that can be configured for a slice type in accordance with techniques described herein can include Third Generation Partnership Project (3GPP) Fourth Generation/Long Term Evolution (4G/LTE) VNFs and/or Fifth Generation (5G) VNFs, as may be prescribed, at least in part, by 3GPP standards.

To provide mobile network services associated with a given slice type, a slice of the given slice type can be instantiated in which the instantiated slice for the slice type can provide certain mobile network services to a number of UEs. Various example slice types can include, but not be limited to, a cellular vehicle to everything (V2X) slice type that can provide cellular V2X services, an Internet of Things (IoT or IOT) massive IoT (mIoT) slice type that can provide IoT related services, an Ultra-Reliable Low-Latency Communication (URLLC) slice type that can provide URLLC services, an enhanced Mobile Broadband (eMBB) slice type that can provide mobile broadband services, a massive Machine-Type Communication (mMTC) slice type that can provide MTC services, a High Performance Machine-Type Communication HMTC) slice type that can provide HMTC services, etc. Other slice types can be envisioned.

Per-3GPP Technical Specification (TS) 23.501, Section 5.15.2, Single-Network Slice Selection Assistance Information (S-NSSAI) can be used to uniquely identify a slice in which an S-NSSAI includes a Slice/Service Type (SST), which indicates the expected slice behavior for a slice requested by a UE in terms of expected features and services, and a Slice Differentiator (SD), which is optional and can be used to differentiate among multiple slices of a same SST. Generally, a slice type/S-NSSAI can be referenced/identified using a numerical value for the SST, such as S-NSSAI-1, S-NSSAI-2, etc.

The Global System for Mobile Communications Association (GSMA) and the Third (3rd) Generation Partnership Project (3GPP) are moving towards defining network slices that can be operated in specific frequency bands. For example, a first network slice, Network Slice-1 (e.g., S-NSSAI-1), can be configured to operate in a first frequency band 'F1' and a second frequency band 'F2', whereas a second network slice, Network Slice-2 (e.g., S-NSSAI-2), can be configured to operate in a third frequency band 'F3'. In this scenario, for a UE to access Network Slice-2, it must operate in frequency band F3. Thus, a frequency band indicator can be another element that can be utilized as slice configuration parameter set that can be incorporated into GSMA-defined slice configuration parameters. As referred to herein, a 'frequency band' can be considered an interval or range of frequencies in the frequency domain, which can be identified by the bounds of a lower frequency and a higher frequency for uplink (UL) and downlink (DL) communications. For example, as prescribed by 3GPP Technical Specification (TS) 38.101, New Radio (NR) operating band 'n1', which may also be referred to as the 2100 Megahertz (MHz) frequency band, includes lower and upper bounds for UL communications (i.e., transmission by a UE/reception by a base station) from 1920 MHz to 1980 MHz and for DL communications (i.e., transmission by a base station/reception by a UE) from 2110 MHz to 2170 MHz. Thus, the lower bound for the n1 2100 MHz operating/frequency band may be 1920 MHz and the upper bound for the n1 2100 MHz operating/frequency band may be 2170 MHz. Other operating/frequency bands are prescribed by 3GPP specifications. The terms 'frequency band', 'frequency spectrum' can be used herein interchangeably and may refer to a collection or set of radio frequencies (i.e., between an upper and a lower bound) or, more generally, radio resources, through which services for a network slice can be accessed by one or more UEs.

Consider FIG. 1, for example, which illustrates example details regarding different frequency indicators that may be associated with a given network slice 100, in accordance with embodiments herein. Also shown in FIG. 1 are a number of UEs including a UE 102-1, a UE 102-2, and a UE 102-3. As shown in FIG. 1, network slice 100 can be configured such that it can be operated (e.g., for UEs 102-1, 102-2, and 102-3 seeking to avail services of the network slice 100) within an operating frequency band or spectrum (band/spectrum) 120 provided by a radio node 122, such as a gNodeB, such that operating frequency band/spectrum is delimited by an upper frequency bound '$F_{UPPER}$' and a lower frequency bound '$F_{LOWER}$'.

For the example of FIG. 1, the frequency band/spectrum 120 can further be divided or allocated between: 1) an operator-owned band/spectrum F1 120-1 (of the overall frequency band/spectrum 120) in which the operator-owned band/spectrum F1 120-2 includes radio resources (e.g., frequencies) of the overall network slice 100 operating frequency band/spectrum 120 that can be utilized between and/or inclusive of the lower frequency bound $F_{LOWER}$ and an intermediate frequency bound '$F_{INT}$'; and 2) an enterprise-owned band/spectrum F2 120-2 (of the overall frequency band/spectrum 120) in which the enterprise-owned band/spectrum F2 120-2 includes radio resources (e.g., frequencies) of the overall network slice 100 operating band/spectrum 120 that can be utilized between the intermediate frequency bound $F_{INT}$ (potentially including $F_{INT}$, depending on frequency allocation of the slice to the enterprise) and the upper frequency bound $F_{UPPER}$ (potentially including $F_{UPPER}$ depending of frequency allocation to the enterprise).

As illustrated in FIG. 1, UEs 102-1, 102-2, and 102-3 can utilize the network slice 100 via different radio resources for Quality of Service (QoS) flows/Protocol Data Unit (PDU) sessions for the UEs. For example, UE 102-1 may have a QoS flow 104-1 for network slice 100 that is accessed by the UE 102-1 via a radio resource (e.g., frequency) $F_{104-1}$ of the enterprise-owned band/spectrum F2 120-2. In another example, UE 102-2 may have a first QoS flow 104-2-1 for a network slice that is accessed by the UE 102-2 via a radio resource $F_{104-2-1}$ of the enterprise-owned band/spectrum F2 120-2 and may have a second QoS flow 104-2-2 for the network slice 100 that is accessed by the UE 102-2 via a radio resource $F_{104-2-2}$ of the operator-owned band/spectrum F1 120-1. In yet another example, UE 102-3 may have a QoS flow 104-3 for the network slice 100 that is accessed by the UE 102-3 via a radio resource $F_{104-4}$ of the operator-owned band/spectrum F1 120-1. Thus, as illustrated in FIG. 1, UEs may access services of a network slice via any combination of radio resources—enterprise-owned, operator-owned, and/or even third-party owned—in order to avail services of a the network slice.

With the adoption of private 5G for enterprise applications, a network slice that is configured by a network operator for use by a given enterprise (e.g., the network slice can be operated/managed by the network operator and leased to the enterprise for use of the slice by the UEs of the enterprise) can be configured with one or more frequency bands, which can include radio resources (e.g., frequencies) that can be utilized by enterprise UEs to avail services of the slice. In some instances, the configured frequency bands may or may not be owned by a mobile network operator (MNO) or by the enterprise (e.g., may be owned by a third-party).

For example, in one instance it may be possible that the enterprise has a license for a particular spectrum and, thus, owns the spectrum while using a core network provided by an MNO. It may also be possible that an enterprise may obtain core network service from one operator, and may obtain spectrum from some other operator. Spectrum policies are complex and can be different across different regulatory domains. Thus, it can be observed that a network slice configured by a mobile operator for a given enterprise can be using:
  frequency bands owned by a mobile network operator;
  frequency bands owned by an enterprise;
  frequency band owned by a third-party operator;
  frequency bands from an unlicensed range; and/or
  a mix of any of the above.

Given the possibility of different network slice configurations, it is a reasonable to expect an operator to apply different charging rules for enterprise traffic (i.e., enterprise UE traffic) based on the frequency bands/radio resources that are used for the enterprise traffic.

3GPP standards have defined a charging model for various data traffic usage, but an underlying assumption of the current 3GPP standards-based model is that radio spectrum is owned by a mobile network operator. Therefore, there are no semantics to provide frequency-ownership indications or tags in UE charging records (also referred to as Charging Data Records (CDRs)) under the current 3GPP standards-based model. Such distinction in the past may not have had made sense, but now with the introduction private 5G network environments and with regulatory bodies opening up spectrum for enterprise use under different spectrum policies, there is a need to provide semantics in the charging interfaces for reflecting the frequency/spectrum ownership aspects that may affect charging.

Techniques herein provide for the ability to provide radio resource ownership indicators in charging records of a charging system. In some instances, providing radio resource ownership indicators in charging records of a charging system can enable enhanced billing/settlement/financial clearing charging models for any combination of public and/or private mobile networking environments. In various embodiments, radio resources can be identified as a radio spectrum, a radio band, a radio frequency or frequencies, a radio beam identified by a beam identifier, combinations thereof, and/or the like.

Figure 2:
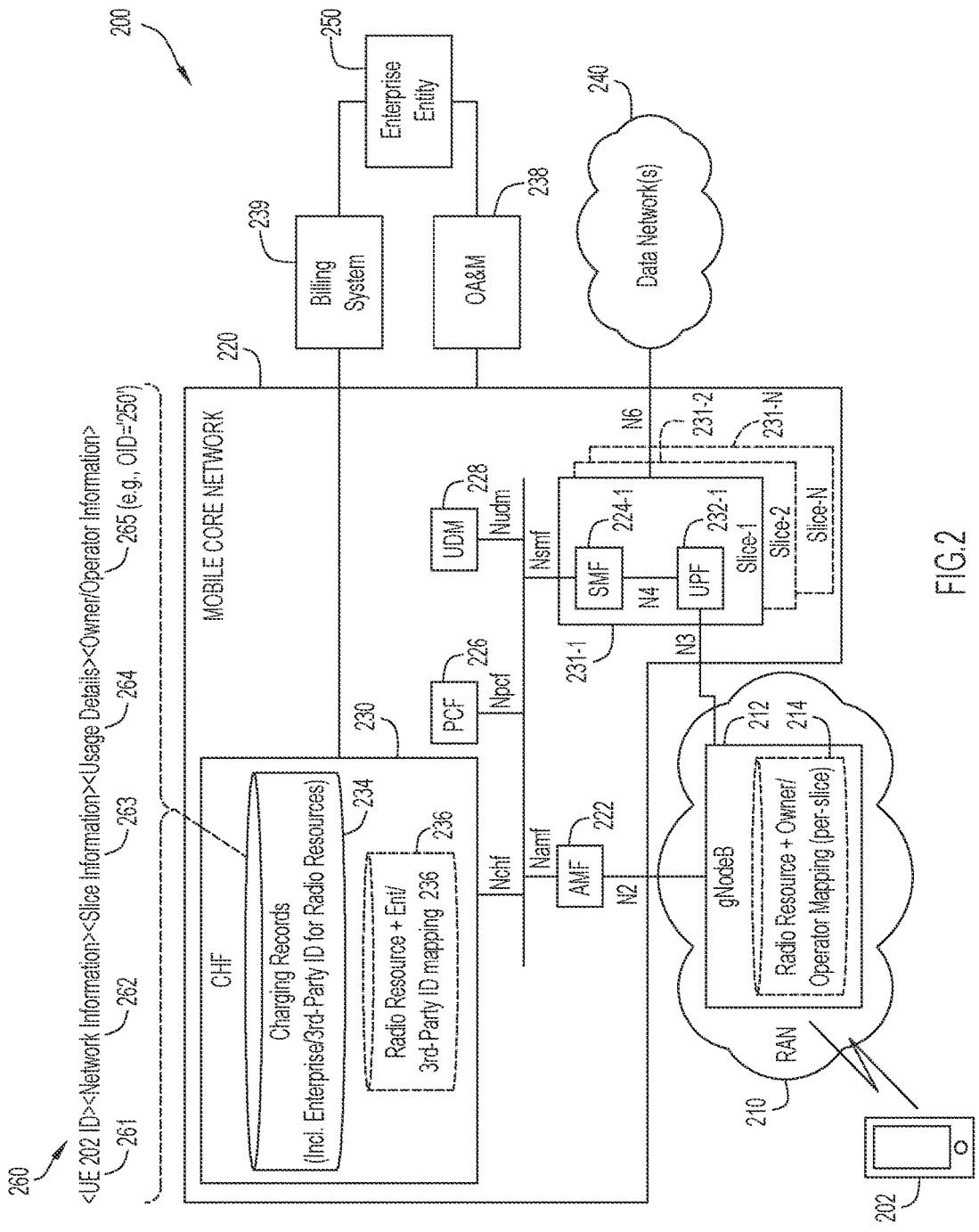
FIG. 2 is a diagram of a system in which techniques may be implemented to provide radio resource ownership indicators for charging records of a charging system or function, according to an example embodiment.

FIG. 2 is a diagram of a system 200 in which techniques may be implemented to provide radio resource (e.g., frequency, etc.) ownership indicators for charging records of a charging system or function, according to an example embodiment. System 200 may include a UE 202, a Radio Access Network (RAN) 210, and a mobile core network 220. Also shown in system 200 are an Operations, Administration, and Maintenance (OA&M) network element, referred to herein as OA&M 238, a billing system 239, one or more data network(s) 240, and an enterprise entity 250.

In at least one embodiment, RAN 210 may be configured with any combination of one or more 3GPP 5G/nG gNB or gNodeB, such as a gNodeB 212, and/or 3GPP 4G/LTE evolved node Bs (eNodeBs or eNBs) (not shown) to facilitate network connectivity between UE 202 and mobile core network 220. In some instances, RAN 210 may be characterized as a next generation (NG) RAN (NG-RAN).

In at least one embodiment, mobile core network 220 may be representative of a 5G core network (5GC) including various network functions (NFs)/VNFs, such as an Access and Mobility Management Function (AMF) 222, a Policy Control Function (PCF) 226, a Unified Data Management (UDM) entity 228 (referred to herein interchangeably as 'UDM 228'), and a charging function (CHF) 230. Although not illustrated, mobile core network 220 may also include any combination of 4G/nG network elements. In some instances, UDM 2288 may further interface with a Unified Data Repository (UDR) (not shown).

Mobile core network 220 may also include mobile network resources such as a number of slice instances that may be instantiated for corresponding slice types provided by mobile core network 220 for various services (e.g., mIoT, URLLC, etc.) that may be provided mobile core network 220 for one or more sessions for UE 202. A number of instantiated network slice instances are illustrated in FIG. 2 for mobile core network 220. For example, Slice-1 231-1 is illustrated in mobile core network 220 and may represent an instantiated slice instance for a given slice type that may include a Session Management Function (SMF) 224-1 and a User Plane Function (UPF) 232-1 and may be identified using an S-NSSAI, such as S-NSSAI-1 in this example. Any number of additional network slices, such as a slice-2 231-2 through an 'N' number of slices slice-N 231-N may also be instantiated within mobile core network 220 for any number of additional network slices that may be support by mobile core network 220. Each of slice-2 231-2 through slice-N 231-N may include similar VNFs, such as corresponding SMFs and UPFs, which are not shown in FIG. 1 for purposes of brevity only. In general, slice-1 231-1 may represent a default slice of mobile core network 220 with which a UE, such as UE 202 may establish an initial PDU session upon registration with mobile core network 220.

In various embodiments, the data network(s) 240 of FIG. 1 may be any combination of the Internet, a gaming network, an Internet Protocol (IP) Multimedia Subsystem (IMS), an Ethernet data network, Ethernet switching system(s), and/or the like. Generally, the IMS may provide for communicating IP multimedia services, such as voice calls (e.g., voice over IP (VoIP)), etc. with UE 202.

A UE, such as UE 202, may be associated with any user, subscriber, employee, client, customer, electronic device, etc. wishing to initiate a flow in system 200 and may be inclusive of any device that initiates a communication in system 200, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 200. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.)], controllers, software, logic, and/or any other elements/entities that may facilitate over-the-air RF connections with one or more access networks. Enterprise entity 250 may be any enterprise (e.g., business, government agency, educational/university institution, etc.) that may own/operate/manage UE 202.

A gNodeB/eNodeB, such as gNodeB 212, may implement a wireless wide area (WWA) (e.g., cellular) air interface and, in some instances also a wireless local area (e.g., Wi-Fi®) air interface, for any combination of Radio Access Technology (RAT) types (sometimes referred to more generally as 'accesses' or 'access types') for RAN 210 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum WLA accesses such as IEEE 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. Thus, a RAN 210, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, etc.) through which one or more UE, such as UE 202, may utilize to connect to RAN 210 for one or more sessions (e.g., voice, video, data, gaming, combinations thereof, etc.).

As illustrated in FIG. 2, gNodeB 212 may interface with AMF 222 (e.g., via a 3GPP N2 interface) and UPF 232-1 of slice-1 231-1 (e.g., via a 3GPP N3 interface) of mobile core network 220. AMF 152 may further interface with SMF 224-1 of slice-1 231-1, which may further interface with UPF 232-1 (e.g., via a 3GPP N4 interface) which may further interface with data network(s) 240 (e.g., via 3GPP N6 interfaces). AMF 222 and SMF 224-1 can each further interface with PCF 226, UDM 228, and CHF 230 corresponding service-based interfaces (SBIs), as shown in FIG. 2, facilitating interconnection among the various network functions. Each of PCF 226, UDM 228, and CHF 230 may also interface and access services among each other via the corresponding service-based interfaces. For example, services corresponding to SMF 224-1 may be accessed by other element(s) via a corresponding service-based interface Nsmf, AMF 222 services may be accessed by other element(s) via a service-based interface Namf, PCF 226 services may be accessed by other element(s) via a service-based interface Npcf, UDM 228 services may be accessed by other element(s) via a service-based interface Nudm, and CHF 230 services may be accessed by other element(s) via a service-based interface Nchf. It is to be understood that gNodeB 212 and UPF 232-1 may also access services of any of the NFs shown FIG. 2. Additionally, VNFs for each of slice-2 231-2 through slice-N 231-1, such as SMFs/UPFs (not shown) for the slices may also interface with AMF 222, gNodeB 212, PCF 226, UDM 228, and CHF 230 via corresponding interfaces as discussed above for the various network elements.

Further for FIG. 2, OA&M 238 may interface with any network function of mobile core network 220 and/or gNodeB 212 of RAN 210 via any combination of interfaces supporting any combination of protocols, such as Network Configuration Protocol (NETCONF), Yet Another Next Generation (YANG) data model(s), Application Programming Interface (API), Representational State Transfer (REST or RESTful) interface, Plug and Play (PnP) interface, Command-Line Interface (CLI), and/or the like to facilitate various operations discussed herein. Generally, billing system 239 may interface with CHF 230 using any appropriate interface (e.g., NETCONF, API, etc.) and may obtain CDRs from CHF 230 in order to determine an amount data utilized by UE 202 for a given radio resource owned/operated by different stake holders (e.g., enterprise entity 250) and can bill the stake holders accordingly based on the UE 202 usage. Enterprise entity 250 may interface using any appropriate interfaces (e.g., API, etc.) with billing system 239 and OA&M 238. In some instances, connectivity for OA&M 238, billing system 239, and enterprise entity 250 may be facilitated via data network(s) 240

In addition to various operations discussed for techniques herein, an AMF, such as AMF 222, may facilitate access and mobility management control/services for one or more UE, such as UE 202, to facilitate an over-the-air RF connection between the UE 202 and the gNodeB 212. In addition to various operations discussed for techniques herein, an SMF, such as SMF 224-1, may be responsible for UE PDU session management (SM), with individual functions/services being supported on a per-session basis in order to facilitate data transfer(s) between a UE and one or more of data network(s) 240. Generally, a UPF, such as UPF 232-1, may operate as a VNF to provide packet routing and forwarding operations for user data traffic and may also perform a variety of functions such as packet inspection, traffic optimization, Quality of Service (QoS), policy enforcement and user data traffic handling (e.g., to/from data network(s) 240), and billing operations (e.g., accounting, usage reporting, etc.) for UE 202 sessions.

Typically, a PCF, such as PCF 226 stores policy data for the system 200 to provide policy control services (e.g., to facilitate access control for UE 202, network selection, etc.). Typically, a UDM, such as UDM 228 stores subscription data for subscribers (e.g., UE 202) that can be retrieved and/or otherwise obtained/utilized during operation of system 200. Typically, a CHF, such as CHF 230, provides support for charging services such as facilitating the transfer of policy counter information associated with subscriber (e.g., UE 202) spending limits, usage, etc. PCF 226, UDM 228, and CHF 230 may facilitate other operations in accordance with embodiments as described herein. Generally, OA&M 238 may provide for configuring, monitoring, managing, etc. any network elements of system 200 and may facilitate other operations in accordance with embodiments as described herein.

During operation of the mobile network architecture as illustrated in FIG. 2, embodiments herein may facilitate providing radio resource (e.g., frequency) ownership indicators that can be utilized by a charging system, such as CHF, using various approaches. Generally for the various approaches described herein, the RAN 210 can be configured with various radio resource mapping information (e.g., frequency ranges, bands, beam identifiers) that can be used for a given network slice for a given owner/operator (e.g., enterprise entity, MNO, third-party entity, etc.) and the RAN 210 can manage these resources and use them across different gNodeBs For a first approach, the OA&M 238 may configure gNodeB 212 with a per-slice (e.g., for each of slice-1 231-1, slice-2 231-2, etc.) radio resource to owner/operator mapping 214 (radio resource+owner/operator mapping) in which an identifier for an owner/operator of a radio resource can be stored in association with an identifier/identifiers of the radio resource (e.g., spectrum, radio frequency/frequencies or, more generally, the radio resources) that is owned/operated by the owner/operator, which may be any of an Service Provider (SP)/MNO, enterprise entity, third-party, etc. For the embodiment of FIG. 2, consider that certain radio resources are configured for enterprise entity 250 that owns/operates/manages UE 202. In at least one embodiment, an identifier for an owner/operator of a radio resource that is an SP/MNO can be identified using a Public Land Mobile Network (PLMN) identifier (ID) comprising a Mobile Country Code (MCC) and a Mobile Network Code (MNC), 'MCC-MNC', that uniquely identifies the SP/MNO (e.g., 'MCC-MNC'='310-010'. In various embodiments, an identifier (ID) for an enterprise entity or a third-party, such as enterprise entity 250 for the embodiment of FIG. 2, may be a 3GPP Object Identifier (OID), an Organizationally Unique Identifier (OUI), a Roaming Consortium Organizational Identifier (RCOI), and/or the like that may be used to uniquely identify an enterprise entity within a mobile core network, such as mobile core network 220.

When data traffic starts for a given UE session, such as a PDU session for UE 202 as shown in FIG. 2, that utilizes the spectrum owned or operated by the enterprise entity 250 for a mobile network resource, such as for slice-1 231-1, the gNodeB 212 can send a RAT Data Usage Report message to AMF 222 for the QoS flow associated with the UE 202 (that utilizes the mobile network resource) in which the RAT Data Usage Report message includes a RAT Usage Information IE (information element) that includes usage details including the enterprise ID enterprise entity 250 (e.g., OID for enterprise entity 250, etc.) and an identifier of the radio resource utilized by the UE 202 (e.g., an identifier of the frequency/frequency range, band, spectrum, beam, etc. utilized by the UE). If there are multiple QoS flows for UE 202 that utilize multiple radio resources, the gNodeB 212 can send RAT usage reports for every QoS flow for the UE 202.

Regarding radio beam resources, in some instances, a UE, such as UE 202, may access broadcast beam resources and/or single beam resources via for a network slice. Broadcast beam resources may help to ensure that the most consistent service is obtained across the service area, whereas single beams can help to ensure an optimized use of frequency resources. In some instances, broadcast beam resources can be utilized for shared cell implementations (e.g., multiple gNodeBs broadcast/serve a same cell identity), whereas single beam resources can be utilized for unique cell implementations (e.g., each gNodeB broadcasts/serves a unique cell identity).

Generally, a beamformed system can use a plurality of antenna elements to adapt the composite antenna gain pattern generated by the antenna elements. The system can apply a set of amplitude and phase weights to the signals applied to individual antenna elements to direct the antenna main lobe pattern and/or side lobes and/or nulls towards specific azimuth and/or elevation angles. The use of specific azimuths and/or elevation angles can be used to beneficially direct radiated energy and receive energy to/from locations of specific user devices, in preference to other locations. Opportunistically, then serving a plurality of devices (e.g., UEs), the radiation pattern used to serve independent devices can generate a high degree of orthogonality between the channels used to serve individual devices. This allows multiple devices to be served simultaneously, using spatial multiplexing to simultaneously direct radiated energy towards a first device using a first set of antenna weights and towards a second device using a second set of antenna weights.

In order to support beamforming in one embodiment, pre-defined beams can be defined for a radio node, such as gNodeB 212. Each beam may represent a set of weights and phases applied to a set of antenna elements for the gNodeB 212 and can be represented by a 15-bit beam identifier (beam-ID) in which a beam-ID of zero (0) may correspond to a broadcast beam and other beam-IDs may correspond to predefined antenna patterns. In various embodiments, one or more beam ID(s) may be assigned to a given owner/operator for a given network slice/slice(s), such that the owner/operator can be identified in charging records for UEs utilizing such resources.

Returning to the present example, the AMF 222 can then send the RAT usage details to the SMF 224-1, which may also receive usage reports for the UPF 232-1 for the UE 202 session, for example, utilizing Packet Forwarding Control Protocol (PFCP) Session Report Request messaging sent from the UPF for the UE 202 session. Utilizing the usage details/reports received from both the AMF 222 and the UPF 232-1, the SMF 224-1 can generate charging information for the UE 202 PDU session, such as one or more charging record(s) (e.g., CDR(s)) for the UE 202 PDU session, and send the charging record(s) to the CHF 230 that include the enterprise entity ID (e.g., OID, etc.) for enterprise entity 250. The CHF 230 then applies the correct rating group for the UE 202 usage considering the spectrum usage and stores the UE 202 usage in charging records 234 such that the charging records can be stored in association with the enterprise entity ID and the CHF 230 can send the charging records to billing system 239. Billing system 239 can determine an amount data utilized by a UE (e.g., UE 202) for a given radio resource owned/operated by different stake holders and can bill the stake holders accordingly based on the UE usage (e.g., bill enterprise entity 250 regarding UE 202 usage). In various embodiments, charging rates may be different for data sent on different frequencies owned/operated by different entities. For example, in one instance data communicated by UE 202 on a given radio resource owned/operated by enterprise entity 250 may be charged at a reduced rate as compared to radio resources not owned/operated by enterprise entity 250.

FIG. 2 illustrates an example charging record 260 for UE 202 PDU session utilizing radio resources of slice-1 231-1 that are owned/operated by enterprise entity 250 in which the example charging record 260 may include UE identifying information 261 for UE 202 (e.g., International Mobile Subscriber Identity (IMSI), Subscription Permanent Identifier (SUPI), Subscription Concealed Identifier (SUCI), or the like), network information 262 (e.g., Public Land Mobile Network (PLMN) ID, etc.), slice information 263 (e.g., S-NSSAI value), usage details 264 for the UE 202 PDU session (e.g., volume information, time information, uplink/downlink usage, QoS information, etc. as may be prescribed by 3GPP standards), and owner/operator information 265, which for the embodiment of FIG. 2 illustrates an OID value of '250' that may be the OID corresponding to enterprise entity 250, in this example.

In some instances, a PCF 226 may send Policy Charging and Control (PCC) rules to the SMF 224-1 that specify whether a QoS flow should utilize operator owned spectrum or enterprise owned/operated spectrum (e.g., a QoS flow to radio resource mapping) along with appropriate rating group (RG) and/or Service Identifier (ID) information. Per 3GPP specifications, an RG is the charging key for a given PCC rule used for rating purposes and a service ID indicates the identifier of a service or service component for a service data flow (e.g., PDU session data flow) related to the PCC rule. In such instances, the SMF 224-1 can store the RG/Service ID information for use with usage reports received for UE sessions, and the SMF 224-1 can also send the QoS flow to radio resource mapping information to the gNodeB 212, which can ensure that certain QoS flows for UE sessions are established utilizing the appropriate radio resources as identified in the mapping.

A second approach may be provided that is similar to that discussed above with reference to the first approach, which slight differences. For example, for the second approach, consider that the gNodeB 212 is not aware of the owner/operator of the radio resources (e.g., frequencies, bands, etc.) that are to be used for different QoS flows. In this second approach, as part of the RAT data usage report sent by the gNodeB 212, the gNodeB 212 can include an indication of the radio resource used for different QoS flows, but without an identifier of the enterprise entity/3rd-Party associated with the radio resource. In this second approach, an Application Function (AF), Network Exposure Function (NEF), or the OA&M 238 can configure, within CHF 230, a radio resource to enterprise entity/3rd-party ID mapping 236 (radio resource+enterprise/3rd-party ID mapping) that includes identifier for an enterprise entity or third (3rd) party (e.g., enterprise entity 250) along with all the radio resources owned/operated by the enterprise entity or the third-party. Generally, SP/MNO owned/operated radio resources may not be identified in charging records, as it may be assumed, unless otherwise identified via an enterprise/3rd-party ID, that radio resources are owned/operated by the SP/MNO and, thus, additional identification of such resources may not be incorporated into charging records.

The SMF 224-1 can include the radio resource information (e.g., an identifier for the radio resource) in charging information, such as charging records, sent to the CHF 230 and the CHF 230, based on the radio resource to enterprise identity/3rd-Party mapping 236, can update the owner/operator of a given radio resource in the charging records 234 maintained by the CHF 230 utilizing the radio resource+enterprise/3rd-party ID mapping 236 (e.g., performing a lookup on the mapping 236 using the identifier of the radio resource to determine the enterprise entity/3rd-party ID). In various embodiments, an identifier of a given radio resource utilized by a given UE can include any of a radio frequency identifier (e.g. a frequency value (in MHz, GHz, etc.), a center frequency value), a radio frequency range, a radio frequency band identifier, a radio frequency spectrum identifier, a beam identifier, any tag, indicator, and/or the like that may represent a given radio resource (e.g., F1, F2, etc.), combinations thereof, and/or the like.

For a third approach, the gNodeB 212 can send radio resource information or an enterprise entity/third-party identifier (e.g., OID) for the spectrum owner/operator (if configured) to the UPF 232-1 in a user plane General Packet Radio Service (GPRS) Tunneling Protocol (GTP-U) extension header for data packets of one or more QoS flow(s) for UE 202. In turn, the UPF 232-1 can include this information in usage reports sent to the SMF 224-1 and the SMF 224-1 can generate charging information for the UE 202 PDU session, such as charging records including the radio resource information and also the enterprise entity identifier, if available, and can send the information to the CHF 230. In the third approach, the CHF 230, instead of the gNodeB 212, can be configured with radio resource to enterprise entity identifier mapping information such that the CHF 230 can update the enterprise entity identifier information in the charging records based on gNodeB 212 provided radio resource information for QoS Flows.

Figure 3A:
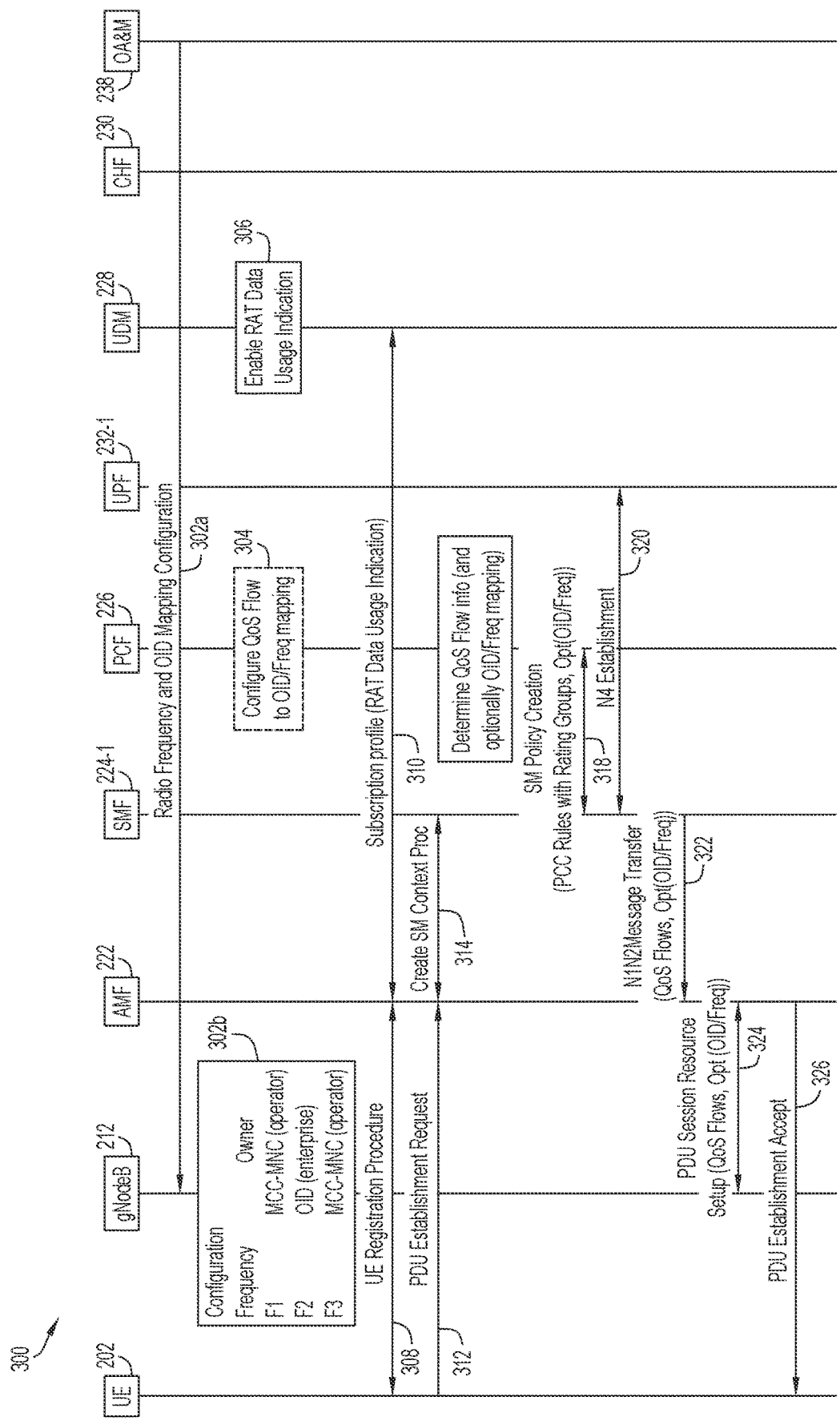
FIGS. 3A and 3B are a message sequence diagram illustrating a call flow associated with providing radio resource ownership indicators for charging records of a charging system or function, according to an example embodiment.
Figure 3B:
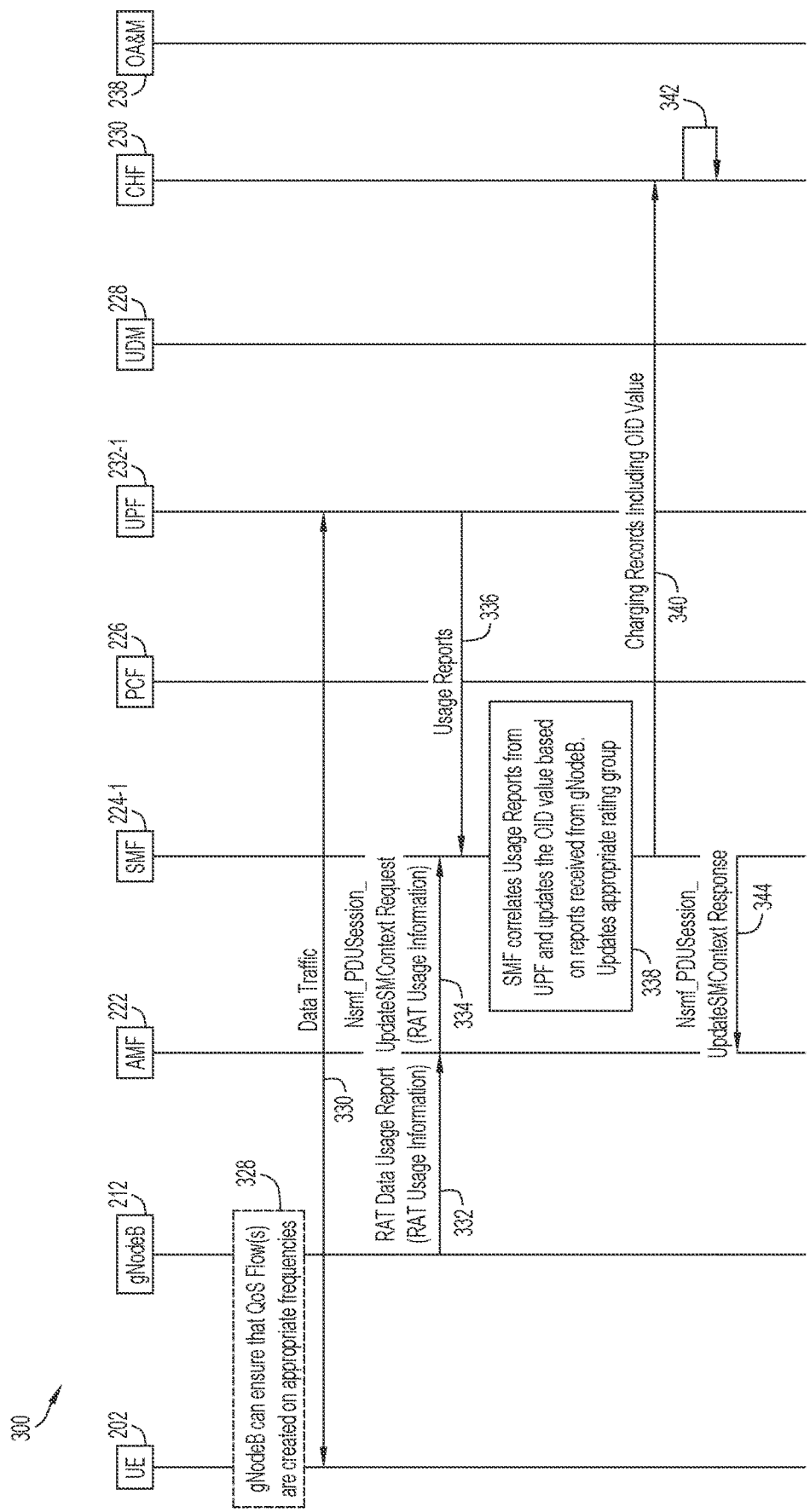
Figure 5A:
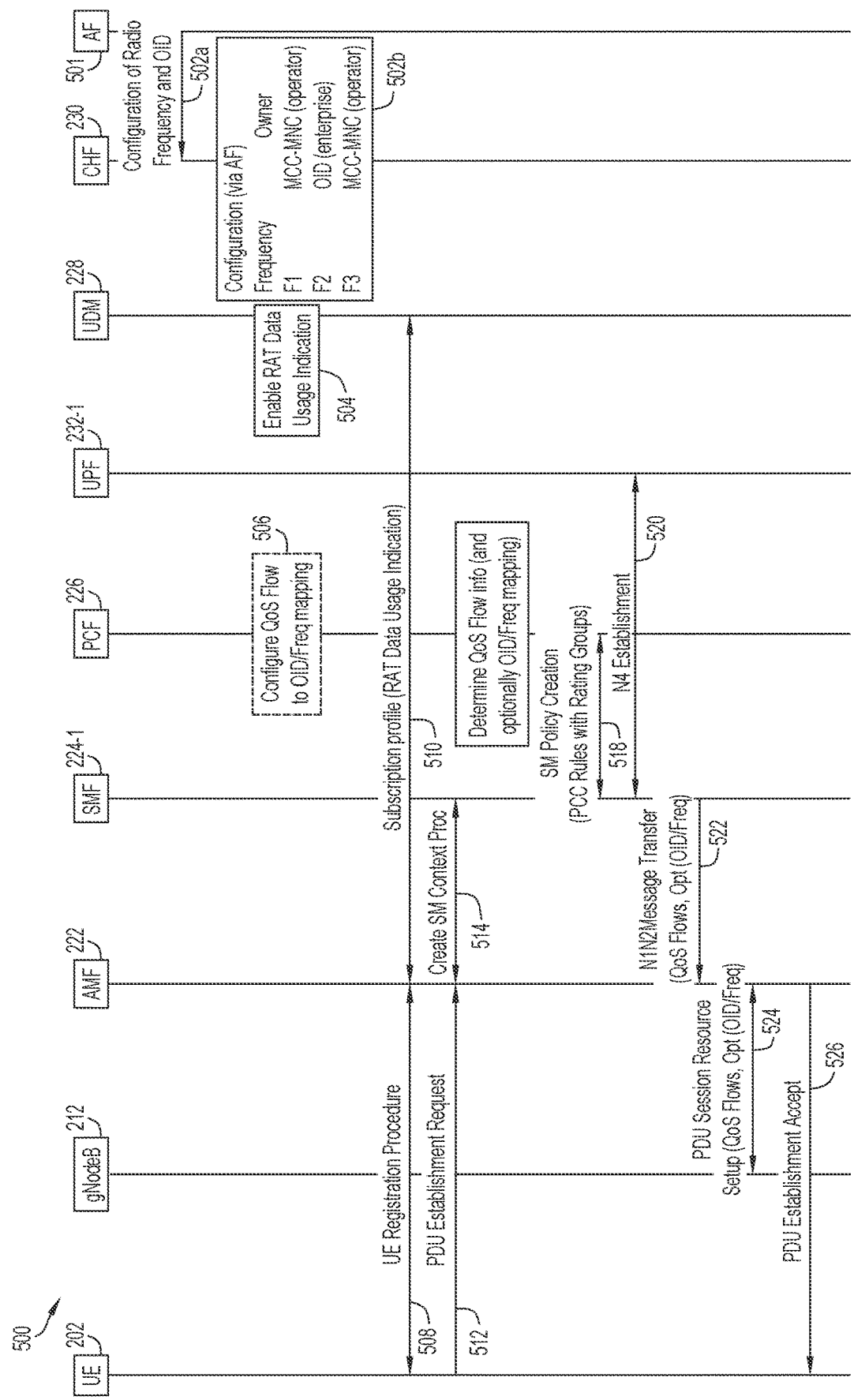
FIGS. 5A and 5B are another message sequence diagram illustrating another call flow associated with providing radio resource ownership indicators for charging records of a charging system or function, according to an example embodiment.
Figure 5B:
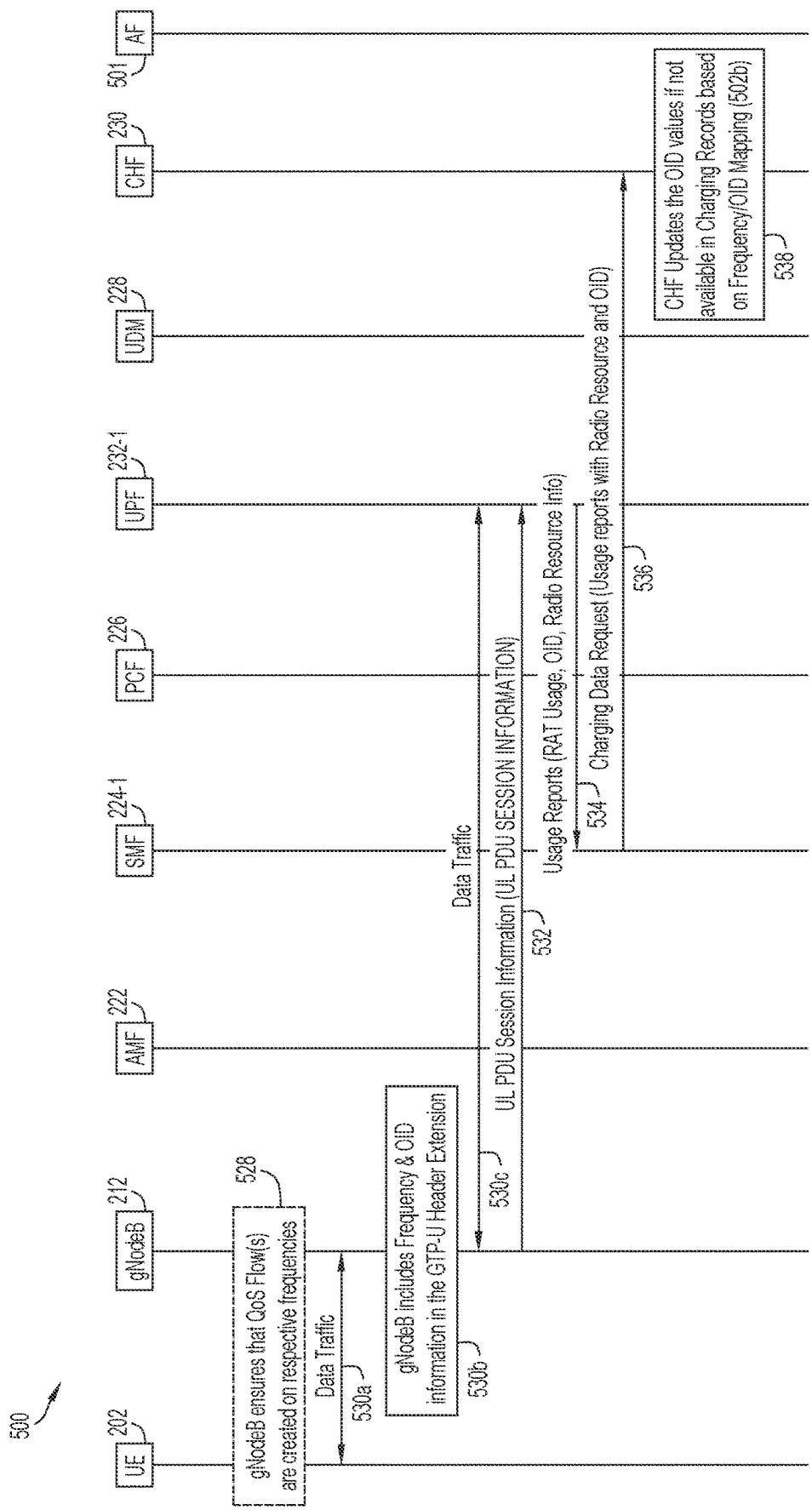

FIGS. 3A-3B and 5A-5B, discussed below, illustrate various operational details associated with the first approach (as illustrated for FIGS. 3A-3B) and the third approach (as illustrated for FIGS. 5A-5B). Referring to FIGS. 3A and 3B, FIGS. 3A and 3B are a message sequence diagram illustrating a call flow 300 associated with providing radio resource ownership indicators for charging records of a charging system or function utilizing the first approach, as discussed above, according to an example embodiment. FIGS. 3A-3B include UE 202, gNodeB 212, AMF 222, PCF 226, UDM 228, CHF 230, SMF 224-1 and UPF 232-1 of slice-1 231-1, as well as OA&M 238. For the embodiment of FIGS. 3A-3B, consider that radio resources for a mobile network resource, such as a network slice, such as for slice-1 231-1, are configured for one or more network elements to identify a radio frequency (e.g., F1, F2, etc.) for a given radio resource and that an enterprise entity ID for enterprise entity 250 is configured as an OID. However, the example details illustrated for the embodiment of FIGS. 3A-3B are provided for illustrative purposes only and are not meant to limit the broad scope of the present disclosure; any radio resource identifiers and enterprise entity IDs can be envisioned within the scope of embodiments herein.

As illustrated at 302, consider at 302a that OA&M 238 configures the gNodeB 212 with a per-slice radio frequency+owner/operator mapping 302b. As illustrated in FIG. 3A, the mapping 302b identifies that radio frequencies F1 and F3 for slice-1 231-1 are associated with (e.g., owned/operated by) a MNO, which can be identified by a PLMN-ID comprising a MCC-MNC that uniquely identifies the MNO, and identifies that a frequency F2 for slice-1 231-1 is associated with an enterprise entity as identified by an OID that uniquely identifies the enterprise entity 250 (not shown in FIGS. 3A-3B). At 306, the UDM 228 is configured to enable RAT data usage indications for a subscription associated with UE 202 (e.g., a subscription for an enterprise user of enterprise entity 250 that operates UE 202, a subscription for UE 202, which may be an IoT device, etc.) that is stored within UDM 228. The configuration to enable RAT data usage indications provided for the subscription associated with UE 202 enables the RAT data usage reporting features as described herein. In some instance, the subscription may include an indication of what traffic types (e.g., QoS flows) may operate on which RAT type, which radio resources (e.g., frequencies), and ownership information for the radio resources such that the configuration provided for UDM enables the reporting of RAT information along with traffic counters (e.g., volume, time, etc.) for UE 202.

The PCF 226 is typically configured with QoS flow information in which PCC rules can include the QoS flow information, such as QoS parameters, etc., that are configured in association with RGs (charging keys) and Service IDs identified for each of one or more QoS flows that may be established for a mobile network. In some embodiments, as shown at 304, the PCF 226 can also be configured with policy information that identifies an association between each of one or more QoS flows and a corresponding OID/frequency mapping for each flow. For example, in one instance, video flows that may be initiated for UE 202 may be mapped to the F2/OID (e.g., F2 may be owned/operated by the enterprise entity 250 and may cost less than SP/MNO radio resource usage) and audio flows that may be initiated for UE 202 may be mapped to the F1/MNC-MCC or the F3/MNC-MCC, such that the gNodeB 212 can ensure that corresponding video or audio flows are created on the appropriate radio resources. The mapping at 304 may include slice-specific mappings for different network slice types.

Returning to the present example, as shown at 308, consider that UE 202 initiates a registration procedure with AMF 222 (via gNodeB 212). The UE 202 registration triggers AMF 222, at 310, to authenticate UE 202 for access to the mobile network via the subscription profile for UE 202 stored in UDM 228 that contains the RAT data usage indication as enabled for the UE 202.

Following registration/successful authentication of UE 202, consider at 312 that UE 202 initiates PDU session establishment with the network via a PDU session establishment request that is communicated to AMF 222, via gNodeB 212, which triggers AMF 222, at 314, to establish context for the UE 202 at SMF 224-1 utilizing a Create Session Management (SM) Context Procedure performed between AMF 222 and SMF 224-1. At 318, SM policy creation for the UE 202 PDU session is performed between PCF 226 and SMF 224-1 and N4 session establishment for the UE 202 PDU session is created by SMF 224-1 via UPF 232-1, as shown at 320. The operations at 318 may include the PCF 226 providing PCC rules to SMF 224-1 during the SM policy creation for UE 202, such that the PCC rules can include the QoS flow information, such as a QoS Flow Identifier (QFI), along with RGs/Service IDs identified for each QoS flow. At 322, the SMF 224-1 can communicate the QoS flow information to AMF 222 via an N1N2 message transfer service communication. Further, as shown at 324, AMF 222 performs a PDU session resource setup with gNodeB 212 that includes the QoS flow information.

In some embodiments, if PCF 226 is configured with a QoS flow to enterprise entity ID/radio resource mapping, as discussed for the QoS flow to OID/frequency mapping noted at 306, above, the operations at 318 may include the PCF 226 providing PCC rules to SMF 224-1 during the SM policy creation for UE 202, such that the PCC rules can include the QoS to OID/frequency mapping information, along with RGs/Service IDs identified for each QoS flow. In such an embodiment, as shown at 322, the SMF 224-1 can communicate the QoS flow to OID/frequency mapping information to AMF 222 via an N1N2 message transfer service communication. Further, as shown at 324, AMF 222 performs a PDU session resource setup with gNodeB 212 that includes the QoS flow to OID/frequency mapping information.

In still some embodiments, the PCF 226 can update the OID/frequency mapping information at any time, based on the owner/operator of a given radio resource changing and/or the mapping of a given QoS flow to a radio resource changing. For example, in some instances, the mapping of a given QoS flow may be changed from one radio resource to another radio resource (e.g., from one frequency to another frequency). In the SMF 224-1, a change of an enterprise/3rd-Party ID (e.g., OID) can result in chargeable events (e.g., as prescribed per 3GPP Technical Specification (TS) 32.255, Sections 5.2.1.6.1/5.2.1.6.2). Further in the SMF 224-1, a change of an enterprise/3rd-Party ID (e.g., OID) for a QoS Flow (e.g., 3GPP TS 32.255 5.2.3.2.2) can trigger the CHF to include additional charging information in the charging record/CDR for a given user.

Returning to the present example, a PDU session establishment accept message is communicated to UE 202 (via gNodeB 212), as shown at 326, which completes the PDU session establishment for UE 202. For embodiments, in which the gNodeB 212 is provided QoS flow to OID/frequency mapping information (e.g., as discussed at 324), the gNodeB 212 can use such mapping information to help ensure that QoS flow(s) that may be created for UE 202 can be created on the appropriate radio resources (e.g., radio frequencies) as identified in the mapping (as shown at 328 of FIG. 3B). For example, at 328 gNodeB 212 can allocate data radio bearers (DRBs) and map QoS flows to DRBs. Based on the mapping, gNodeB 212 can ensure that the QoS flow for the PDU session established for the embodiment of FIGS. 3A-3B. Further for the embodiment of FIGS. 3A-3B, consider that the UE 202 PDU session is created to utilize the radio resource F2 that is associated with the enterprise entity, as identified by the OID.

Continuing with the present example, consider, at 330, that data traffic for the PDU session is exchanged between UE 202 and UPF 232-1 (and potentially one or more data network(s) 240). The data traffic can be GTP-U encapsulated data traffic. The data traffic exchanges can trigger usage reporting by the gNodeB 212, as shown at 332 and 334, and also by the UPF 232-1, as shown at 336.

In accordance with embodiments herein for the first approach, gNodeB 212, which is configured with the radio frequency+owner/operator mapping 302b provides a RAT Data Usage Report message to ANF 222 at 332 that includes RAT usage details within a RAT Usage Information IE indicating radio usage details, such as the radio frequency and the OID associated with the radio frequency utilized by the UE 202 for the PDU session. For example, in one embodiment, the RAT Data Usage Report message may be a SECONDARY RAT DATA USAGE REPORT, as prescribed by 3GPP Technical Specification (TS) 38.413, Section 9.2.14.1, that includes a Secondary RAT Usage Report Transfer IE (as prescribed by 3GPP TS 38.413, Section 9.3.4.23), that further includes a Secondary RAT Usage Information IE (as prescribed by 3GPP TS 38.413, Section 9.3.1.114) that includes a QoS Flows Usage Report List in which a given QoS Flow Usage Report Item can be extended, in accordance with embodiments herein, to include new IEs including 1) a new Radio Resource IE, and 2) a new Owner/Operator IE.

The new Radio Resource IE can identify the radio resource utilized by a UE for a given QoS flow (e.g., radio frequency F2 for the embodiment of FIGS. 3A-3B) and the new Owner/Operator IE can identify the owner/operator of the radio resource (e.g., OID='250' for enterprise entity 250 for the embodiment of FIGS. 3A-3B).

Figure 4:
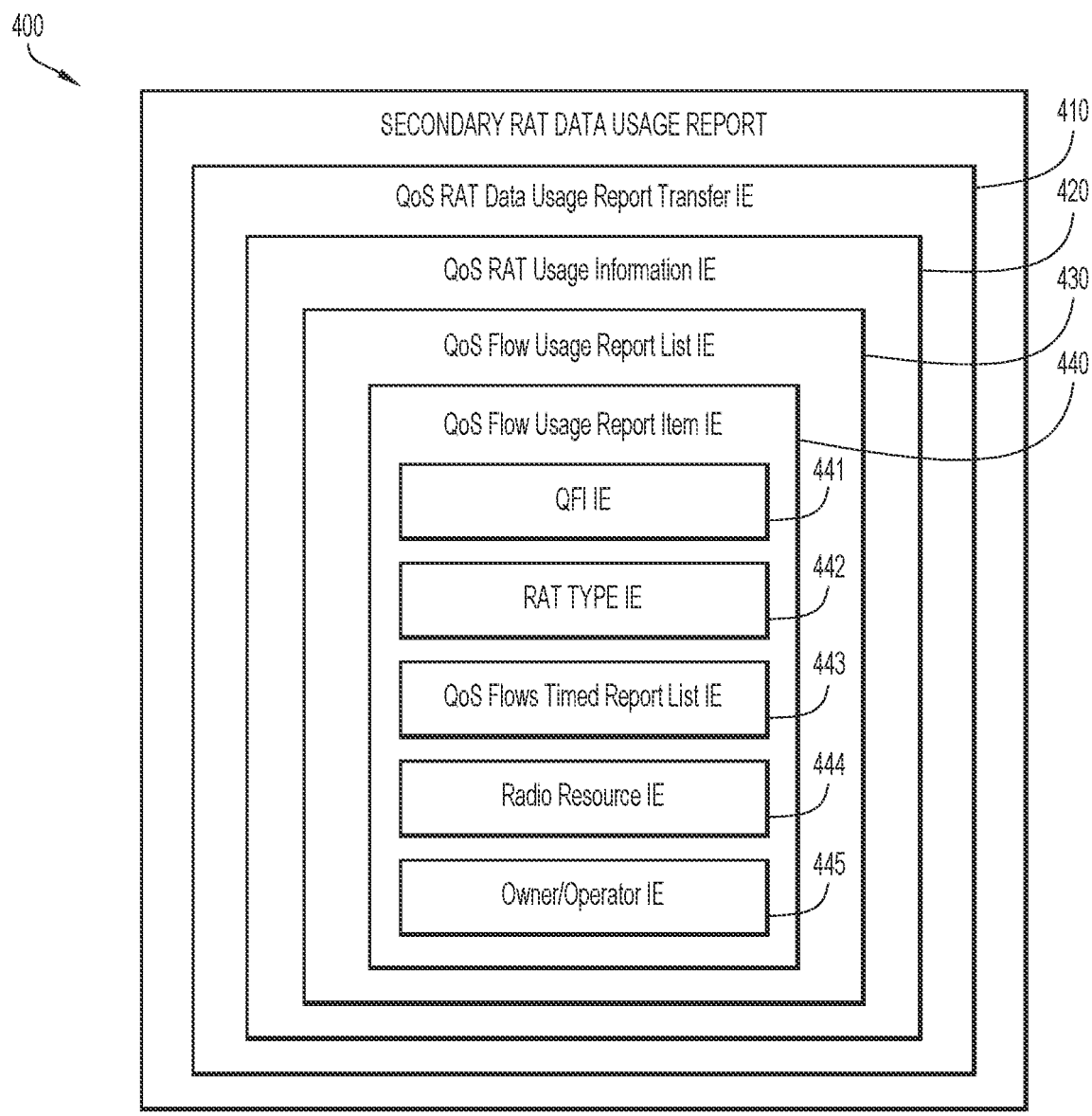
FIG. 4 is a schematic diagram illustrating example details associated with a report that can be enhanced to carry radio resource ownership indicators, according to an example embodiment.

FIG. 4 is a schematic diagram illustrating example details associated with an example SECONDARY RAT DATA USAGE REPORT 400 that can be enhanced to carry radio usage details, such as radio resource ownership indicators, according to an example embodiment. Among other IEs as prescribed by 3GPP TS 38.413, SECONDARY RAT DATA USAGE REPORT 400 includes a Secondary RAT Usage Report Transfer IE 410, that further includes a Secondary RAT Usage Information IE 420 (as prescribed by 3GPP TS 38.413, Section 9.3.1.114) that includes a QoS Flows Usage Report List IE 430 in which a given QoS Flow Usage Report Item IE 440 includes a QoS Flow Identifier (QFI) IE 441 (e.g., identifying a QFI value for the data flow of the UE 202 PDU session), a RAT TYPE IE 442 (e.g., indicating a RAT type of New Radio (NR) for the flow), a QoS Flows Timed Report List IE 443 that can include data usage details for the UE 202 PDU session, and the QoS Flow Usage Report Item IE 440 can be extended, in accordance with embodiments herein, to include new IEs for reporting radio usage details including: 1) a new Radio Resource IE 444 that can be set to identify the radio resource (e.g., F2, in this example) utilized by the UE 202 for the PDU session, and 2) a new Owner/Operator IE 445 that can be set to identify the owner/operator of the radio resource (e.g., the OID of the enterprise entity 250, in this example) identified in the Radio Resource IE 444.

Returning to the embodiment of FIGS. 3A-3B, as shown at 334, the RAT usage details included in the RAT Usage Information IE are further communicated from AMF 222 to SMF 224-1 via an Nsmf_PDUSession_UpdateSMContext Request message. As shown at 336, SMF 224-1 obtains usage reports for the UE 202 PDU session from UPF 232-1. Generally, the SMF 224-1 configures at least one Usage Reporting Rule (URR) in the UPF 232-1 during N4 session establishment (as discussed at 320). Based on the policy exchange with PCF 226 (as discussed at 318), the SMF 224-1 knows which URR (identified using a URR ID) corresponds to which RG/Service ID and may also know which RG/Service ID is associated with which QoS flow. In one embodiment, the UPF 232-1 can provide usage reports to SMF 224-1 using a Usage Report IE contained within a PFCP Session Report Request message (as prescribed per 3GPP TS 29.244, Section 7.5.8.3), which can include various usage details for the PDU session of UE 202, such as URR ID, start time, end time, volume measurements, packet details, duration measurements, report periodicity information, UE 202 IP address, etc. as prescribed by 3GPP TS 29.244, Section 7.5.5.2, in which the usage details can be utilized by SMF 224-1 to generate/update charging information, such as charging records/CDRs for the UE 202 session. For example, SMF 224-1, after receiving the usage details, can create CDR(s) for the UE 202 PDU session and populate the CDR(s) with details regarding the enterprise/ third-part owner/operator information (e.g., OID, etc.) and, in some instances, (e.g., as discussed for the third approach) radio resource information based on the radio usage details obtained from the gNodeB 212/AMF 222 and the usage details obtained from UPF 232-1. The SMF 224-1 knows which Usage Reports map to which QoS flows because the SMF 224-1 configures the URR(s) for UPF 232-1, as discussed above. The Usage Report IE can be included in other PFCP messages, such as a PFCP Session Deletion Request or Response message, a PFCP Session Modification Request or Response message, etc.

As shown at 338, the SMF 224-1 correlates the usage reports obtained from the UPF 232-1 along with the OID value for the enterprise entity 250 based on reports sent from the gNodeB 212 (via AMF 222) and updates the appropriate RG/Service ID information for the usage reports to include the OID value for the enterprise entity 250. At 340, the SMF 224-1 reports charging information for the UE 202 PDU session to the CHF 230, such as charging records/CDRs that include the OID value and, at 342, the CHF 230 stores the charging records along with the OID value for the enterprise entity 250, which can be utilized to facilitate differentiated charging for the UE 202 PDU session for the enterprise owned/operated radio resources utilized by the UE 202. As shown at 344, the SMF 224-1 responds to AMF 222 with an Nsmf_PDUSession_UpdateSMContext Response message.

Thus, as illustrated for the embodiment of FIGS. 3A-3B involving the first approach for providing radio resource ownership indicators in charging records for user equipment, the CHF 230 can apply the correct RG for the UE 202 usage considering the radio frequency usage of UE 202 and can store the UE 202 usage in charging records in association with the enterprise entity 250 ID (OID in the present example). The CHF 230 can send the charging records to a billing system for further use.

Although not shown in FIGS. 3A-3B, a second approach for providing radio resource ownership indicators in charging records may be provided that is similar to the approach shown in FIGS. 3A-3B. For example, for the second approach, consider that the gNodeB 212 is not aware of the owner/operator of the radio resources (e.g., frequencies, bands, etc.) that are to be used for different QoS flows. In this second approach, as part of the RAT Data Usage Report message sent by the gNodeB 212 (e.g., at 332), the gNodeB 212 can include radio usage details, such as an indication of the radio resource used for different QoS flows, but without an identifier of the enterprise entity/3rd-Party associated with the radio resource. In this second approach, an AF, NEF, or the OA&M 238 can configure, within CHF 230, a radio resource to enterprise entity ID or third-party mapping (e.g., radio resource+enterprise/3rd-party ID mapping 236, as shown in FIG. 2) that includes identifier for an enterprise entity and/or third-party (e.g., enterprise entity 250) along with all the radio resources owned/operated by the enterprise entity/third-party. In this second approach, the SMF 224-1 can include the radio resource information (e.g., an identifier for the radio resource) in charging information (e.g., charging records/CDRs) sent to the CHF 230 and the CHF 230, based on the radio resource to enterprise identity mapping, can update the owner/operator of a given radio resource in the charging records (e.g., charging records 234) maintained by the CHF 230 utilizing the mapping (e.g., performing a lookup on the mapping using the identifier of the radio resource to determine the enterprise entity/3rd-party ID).

Referring to FIGS. 5A and 5B, FIGS. 5A and 5B are a message sequence diagram illustrating a call flow 500 associated with providing radio resource ownership indicators for charging records of a charging system or function utilizing the third approach, as discussed above, according to an example embodiment. FIGS. 5A-5B include UE 202, gNodeB 212, AMF 222, PCF 226, UDM 228, CHF 230, SMF 224-1 and UPF 232-1 of slice-1 231-1, and an application function (AF) 501. For the embodiment of FIGS. 5A-5B, consider that radio resources for a mobile network resource, such as for network slice-1 231-1, are configured for one or more network elements to identify a radio frequency (e.g., F1, F2, etc.) for a given radio resource and that an enterprise entity ID provided for enterprise entity 250 (not shown in FIGS. 5A-5B) is configured as an OID (e.g., OID='250'). However, the example details illustrated for the embodiment of FIGS. 5A-5B are provided for illustrative purposes only and are not meant to limit the broad scope of the present disclosure; any radio resource identifiers and enterprise entity IDs can be envisioned within the scope of embodiments herein.

For the embodiment of FIGS. 5A-5B involving the third approach for providing radio resource ownership indicators for charging records, consider at 502a that AF 501 configures the CHF 230 with a radio frequency+owner/operator mapping 502b. The radio frequency+owner/operator mapping 502b can be provided on a per-slice basis (e.g., for each of slice-1 231-1, slice-2 231-2, etc. For example, as illustrated in FIG. 5A, the mapping 502b may be provided for slice-1 231-1 and identifies that radio frequencies F1 and F3 are associated with (e.g., owned/operated by) a MNO, which can be identified by PLMN-ID comprising a MCC-MNC that uniquely identifies the MNO, and identifies that a frequency F2 is associated with enterprise entity 250 (not shown) as identified by an OID that uniquely identifies the enterprise entity 250 (e.g., OID='250').

At 504, the UDM 228 is configured to enable RAT data usage indications for a subscription associated with UE 202 that is stored within UDM 228. In some embodiments, as discussed above and as shown at 506, the PCF 226 can be configured with policy information that identifies an association between each of one or more QoS flows and a corresponding OID/frequency mapping for each flow.

Returning to the present example, as shown at 508, consider that UE 202 initiates a registration procedure with AMF 222 (via gNodeB 212). The UE 202 registration triggers AMF 222, at 510, to authenticate UE 202 for access to the mobile network via the subscription profile for UE 202 stored in UDM 228 that contains the RAT data usage indication as enabled for the UE 202. Following registration/successful authentication of UE 202, consider at 512 that UE 202 initiates PDU session establishment with the network via a PDU session establishment request that is communicated to AMF 222, via gNodeB 212, which triggers AMF 222, at 514, to establish context for the UE 202 at SMF 224-1 utilizing a Create SM Context Procedure performed between AMF 222 and SMF 224-1. At 518, SM policy creation for the UE 202 PDU session is performed between PCF 226 and SMF 224-1 and N4 session establishment for the UE 202 PDU session is created by SMF 224-1 via UPF 232-1, as shown at 520. The operations at 518 may include the PCF 226 providing PCC rules to SMF 224-1 during the SM policy creation for UE 202, such that the PCC rules can include the QoS flow information along with RGs/Service IDs identified for each QoS flow. At 522, the SMF 224-1 can communicate the QoS flow information to AMF 222 via an N1N2 message transfer service communication. Further, as shown at 524, AMF 222 performs a PDU session resource setup with gNodeB 212 that includes the QoS flow information.

In some embodiments, if PCF 226 is configured with a QoS flow to enterprise entity ID/radio resource mapping, as discussed for the QoS flow to OID/frequency mapping noted at 506, above, the operations at 518 may include the PCF 226 providing PCC rules to SMF 224-1 during the SM policy creation for UE 202, such that the PCC rules can include the QoS to OID/frequency mapping information, along with RGs/Service IDs identified for each QoS flow. In such an embodiment, as shown at 522, the SMF 224-1 can communicate the QoS flow to OID/frequency mapping information to AMF 222 via an N1N2 message transfer service communication. Further, as shown at 524, AMF 222 performs a PDU session resource setup with gNodeB 212 that includes the QoS flow to OID/frequency mapping information.

Returning to the present example, a PDU session establishment accept message is communicated to UE 202 (via gNodeB 212), as shown at 526, which completes the PDU session establishment for UE 202. For embodiments, in which the gNodeB 212 is provided QoS flow to OID/frequency mapping information (e.g., as discussed at 524), the gNodeB 212 can use such mapping information to help ensure that QoS flow(s) that may be created for UE 202 can be created on the appropriate radio resources (e.g., radio frequencies) as identified in the mapping (as shown at 528 of FIG. 5B). For the embodiment of FIGS. 5A-5B, consider that the UE 202 PDU session is created to utilize the radio resource F2 that is associated with the enterprise entity 250, as identified by the OID.

Continuing with the present example, consider, at 530a and 530c, that data traffic for the PDU session is exchanged between UE 202 and UPF 232-1 (and potentially one or more data network(s) 240). The data traffic exchanges can trigger the gNodeB 212 to include, as shown at 530b, the identifier for the frequency 'F2' and OID information for the enterprise entity 250 in a GTP-U header extension for each data packet communicated from the gNodeB 212 to the UPF 232-1.

Figure 6A:
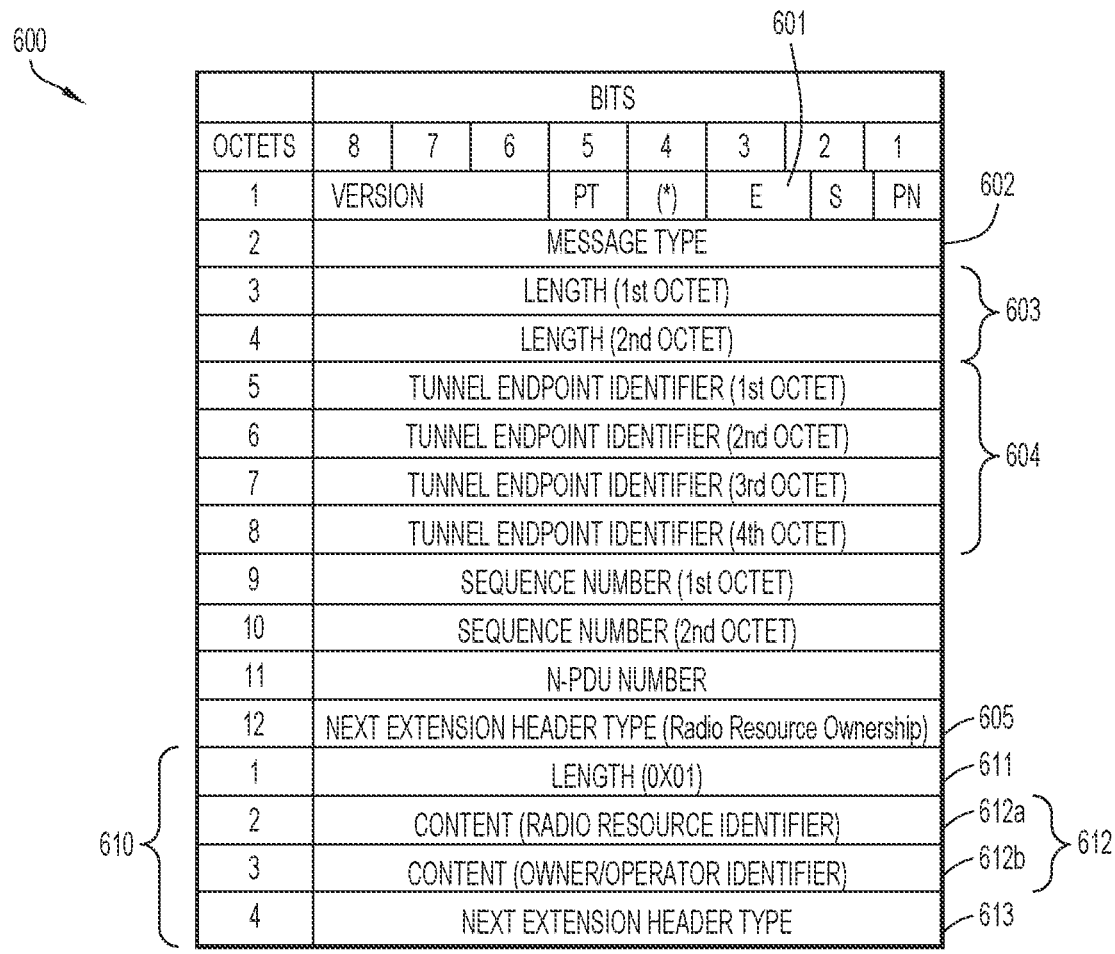
FIGS. 6A and 6B illustrate example details associated with a user plane General Packet Radio Service (GPRS) Tunneling Protocol (GTP-U) extension header that can be enhanced to carry radio resource ownership indicators, according to an example embodiment.
Figure 6B:
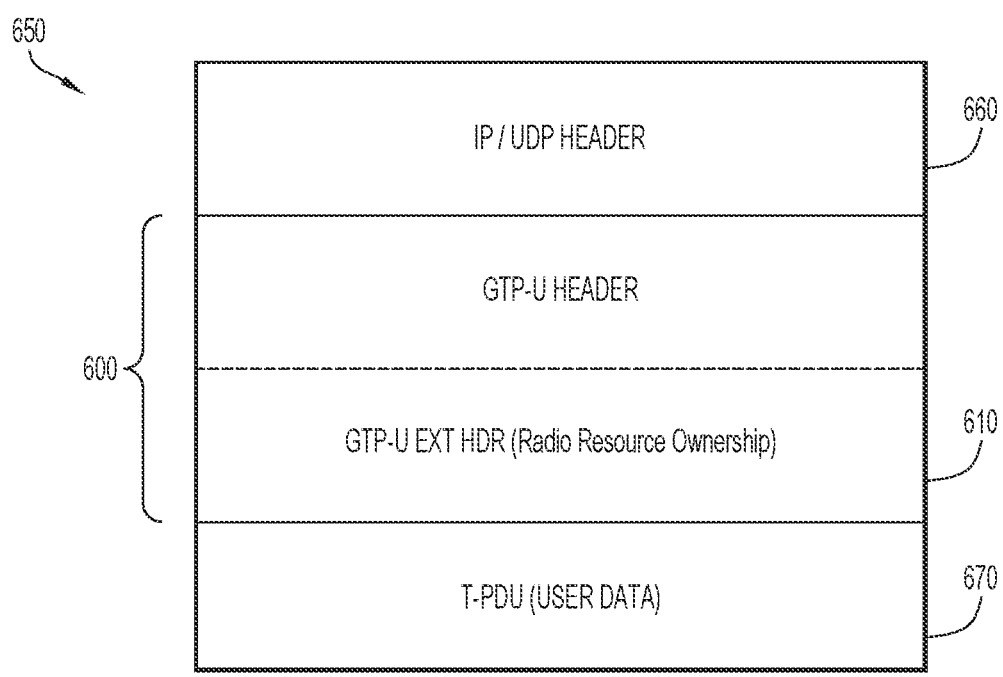

FIGS. 6A and 6B illustrate various example details associated with a GTP-U extension header that can be enhanced to carry radio resource ownership indicators for a UE data flow, according to an example embodiment. For example, FIG. 6A is a simplified diagram illustrating example details associated with a GTP-U header 600 including a GTP-U extension header 610 that may be used to carry radio resource ownership indicators for a UE data flow according to an example embodiment. FIG. 6B is a simplified diagram illustrating example details associated with a GTP-U encapsulated data packet 650 (typically referred to as a G-PDU) that includes an Internet Protocol (IP)/User Datagram Protocol (UDP) header, 660, GTP-U header 600 including GTP-U extension header 610, and a transport PDU (T-PDU) 670 that carries user data for the UE 202 PDU session. Example details associated with FIGS. 6A and 6B are discussed with reference to operations illustrated for the embodiment of FIGS. 5A-5B.

In one example, for the third approach discussed for the embodiment of FIGS. 5A-5B, gNodeB 212 may include within a GTP-U encapsulated data packet, such as GTP-U encapsulated data packet 650 of FIG. 6B, a GTP-U header 600 that includes GTP-U extension header 610, as shown in FIG. 6A, and forward the GTP-U encapsulated data packet 650 to UPF 232-1. Techniques illustrated for the embodiment of FIGS. 5A-5B may include defining a new GTP-U extension header type, referred to herein as a 'Radio Resource Ownership' header type, which can be set to a binary value '1100 0100' (or any other binary value that is not currently defined in 3GPP standards) to indicate the Radio Resource Ownership GTP-U extension header type.

GTP-U encapsulation is generally defined in 3GPP TS 29.281. In at least one embodiment, GTP-U header 600 may include various fields including, but not limited to: an Extension Header Flag (E) field 601, a Message Type field 602, Length fields 603, Tunnel Endpoint Identifier (TEID) fields 604, and a Next Extension Header Type field 605. Extension Header Flag field 601 may be set '1' to indicate the presence of an extension header (e.g., GTP-U extension header 610). Message Type field 602 may be set to a message type '255' indicating a G-PDU packet, Length fields 603 may be set to a length of a payload of encapsulated user data, typically referred to as a Transport-PDU (T-PDU), and TEID fields 604 may be set as defined by 3GPP TS 29.281. For example, TEID fields 604 may be set to values that identify UPF 232-1 as the tunnel endpoint for GTP-U encapsulated data packet 650 for a GTP-U tunnel between gNodeB 212 and UPF 232-1 established for the UE 202 session. Similarly, TEID fields 604 can be set to values that identify gNodeB 212 for GTP-U encapsulated data packets sent from UPF 232-1 to gNodeB 212.

Next Extension Header Type field 605 may be set to binary '1100 0100' (or any other unused value) to indicate that GTP-U extension header 610 is of the type 'Radio Resource Ownership' that can be used to identify a radio resource and an owner/operator of the radio resource for the UE 202 PDU session.

GTP-U extension header 610 may include various fields including a Length field 611, a number of Content fields 612 (including a first Content field 612a and a second Content field 612b), and a Next Extension Header Type field 613. In at least one embodiment, Length field 611 for the first octet of GTP-U extension header 610 may be set to hexadecimal '0x01' (binary '0000 0001') to indicate the length of GTP-U extension header 610 is 4-bytes, the first Content field 612a may be set to a value (e.g., a binary value, etc.) that can be used to identify the radio resource utilized by UE 202 for the PDU session, 'F2' in this example, the second Content field 612b may be set to a value that indicates the owner/operator of the radio resource identified in the first Content field 612a, the OID for the enterprise entity 250 in this example (e.g., OID='250'), and Next Extension Header Type field 613 may or may not be set (depending on whether or not another GTP-U extension header follows GTP-U extension header 610).

In various embodiments, any number and/or combination of other bits of first Content field 612a and/or second Content field 612b may be set to indicate any combination of an identifier for a radio resource and an owner/operator associated with the radio resource.

As illustrated in FIG. 6B, GTP-U encapsulated data packet 650 that may be forwarded from gNodeB 212 to UPF 232-1 includes IP/UDP header 660 [containing source/destination IP addresses and source/destination ports, as per 3GPP TS 29.281], GTP-U header 600 including GTP-U extension header 510 of the type 'Radio Resource Ownership' including the radio resource identifier (F2, in this example) in the first Content field 612a and the owner/operator identifier (OID, in this example) in the second Content field 612b, and a T-PDU 670 including user data for the UE 202 PDU session. The combination of GTP-U header 600 and the T-PDU 670 typically represents a G-PDU.

The UPF 232-1 can utilize the radio resource identifier and the owner/operator identifier included in GTP-U data packets for the UE 202 session in order to correlate data usage at the UPF 232-1 for the UE 202 PDU session with the appropriate radio resource and owner/operator information associated with the UE 202 PDU session.

For the embodiment of FIGS. 5A-5B, the data traffic exchanges for the UE 202 PDU session can trigger RAT data usage reporting by the gNodeB 212 toward UPF 232-1, as shown at 532. The RAT data usage reporting by the gNodeB 212 at 432 can include the gNodeB communicating an uplink (UL) PDU Session Information message to UPF 232-1 that includes an UL PDU SESSION INFORMATION FRAME, as prescribed by 3GPP TS 38.415 of a PDU Type=1, in which QoS flow usage reporting items that are used for reporting RAT data usage for the UE 202 PDU session can be extended to include: 1) a new Radio Resource IE that can be set to identify the radio resource utilized by the UE 202 for the PDU session, and 2) a new Owner/Operator IE that can be set to identify the owner/operator of the radio resource.

Figure 7:
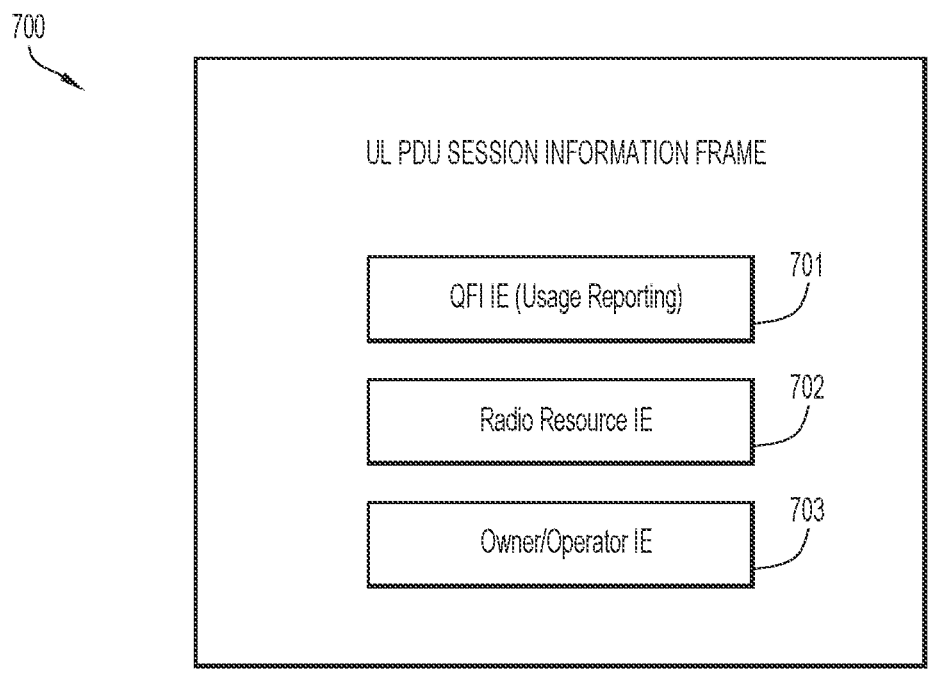
FIG. 7 is a schematic diagram illustrating example details associated with another report that can be enhanced to carry radio resource ownership indicators, according to an example embodiment.

FIG. 7 is a schematic diagram illustrating example details associated with an example UL PDU SESSION INFORMATION FRAME 700 that can be enhanced to carry radio resource ownership indicators, according to an example embodiment. Among other IEs as prescribed by 3GPP TS 38.415, UL PDU SESSION INFORMATION FRAME 700 may include a QFI IE 701 through which various QoS usage details can be reported, a new Radio Resource IE 702 that can be set to identifying the radio resource utilized by the UE 202 for the PDU session, and a new Owner/Operator IE 703 that can be set to identify the owner/operator of the radio resource identified in the Radio Resource IE 702.

Returning to the operations for the embodiment of FIG. 5B as shown at 534, the UPF 232-1 can send usage reports to the SMF that include usage details for the UE 202 PDU session as typically generated by the UPF (e.g., as discussed above at 336) and can additionally include the RAT data usage details reported by gNodeB 212 at 532, such as the volume/count of data on each QFI, along with the radio resource identifier (radio frequency F2, in this example) and the identifier for the owner/operator of the radio resource (OID for the enterprise entity 250, in this example).

As shown at 536, the SMF 224-1 can report charging information to the CHF 230, such as sending a Charging Data Request message to the CHF 230 including the usage reports along with the radio resource identifier (radio frequency F2, in this example) and the identifier for the owner/operator of the radio resource (OID for the enterprise entity 250, in this example) via one or more CDR(s), which triggers the CHF 230, as shown at 538 to update CDRs stored for the UE 202 PDU session to include the owner/operator identifier for the corresponding radio resource, as identified based on the radio frequency+owner/operator mapping 502b configured for the CHF In one instance, a new Information Element (IE), referred to herein as a 'RAN Resource Data Usage Report' IE, can be utilized to send radio resource (e.g., frequency) data usage details to the CHF 230.

For example, on receiving radio resource data usage details from the RAN (via AMF 222 as shown for the embodiment of FIGS. 3A-3B or via the UPF 232-1 as shown for the embodiment of FIGS. 5A-5B), the SMF 224-1 sends this information to the CHF 230 and can utilize the new RAN Resource Data Usage Report IE to send this information. For example, the SMF 224-1 can send a Charging Data Request message to the CHF, as prescribed at least by 3GPP TS 32.255, Section 5.2.2.2, for sending Usage Reports in which the new RAN Resource Data Usage Report IE can be included in the PDU Session Charging Information IE (as prescriber per 32.255, Section 6.2.1.2) of the Charging Data Request message (32.255, Section 6.1.1.2). In one instance, the RAN Resource Data Usage Report IE may be similar to the Secondary RAT Data Usage Report Transfer IE and the Secondary RAT Usage Information IE (as discussed above for FIG. 4) with some additional parameters, such as an Owner/Operator ID IE, and a Radio Resource IE as shown below in TABLE 1, which illustrates an example structure of the new RAN Resource Data Usage Report IE that may be utilized to facilitate various features described herein.

TABLE 1

Structure of RAN Frequency Usage Report

| Information Element | Category | Description |
| --- | --- | --- |
| NG RAN RAT Type | $O_C$ | This field holds the value of RAT Type, as provided by the NG-RAN. |
| QoS Flows Usage Reports | $O_C$ | This filed holds a list of containers per QoS Flow Identifier (QFI) with volumes reported, each container is time stamped. |
| QoS Flow ID | $O_M$ | This field holds the QFI. |
| Start Timestamp | $O_C$ | This field holds the start timestamp of the collected usage. |
| End Timestamp | $O_C$ | This field holds the end timestamp of the collected usage. |
| Downlink Volume | $O_C$ | This field holds the amount of used volume in the downlink (DL) direction (from the mobile network to a given UE). |
| Uplink Volume | $O_C$ | This field holds the amount of volume used in the uplink (UL) direction (from a given UE to the mobile network). |
| Owner/Operator ID | $O_C$ | This field holds the identifier of the enterprise entity or 3rd-party owner/operator of a radio resource. |
| Radio Resource | $O_C$ | This field holds the identifier of a radio resource (e.g., frequency, band, beam identifier, etc.) |

Figure 8:
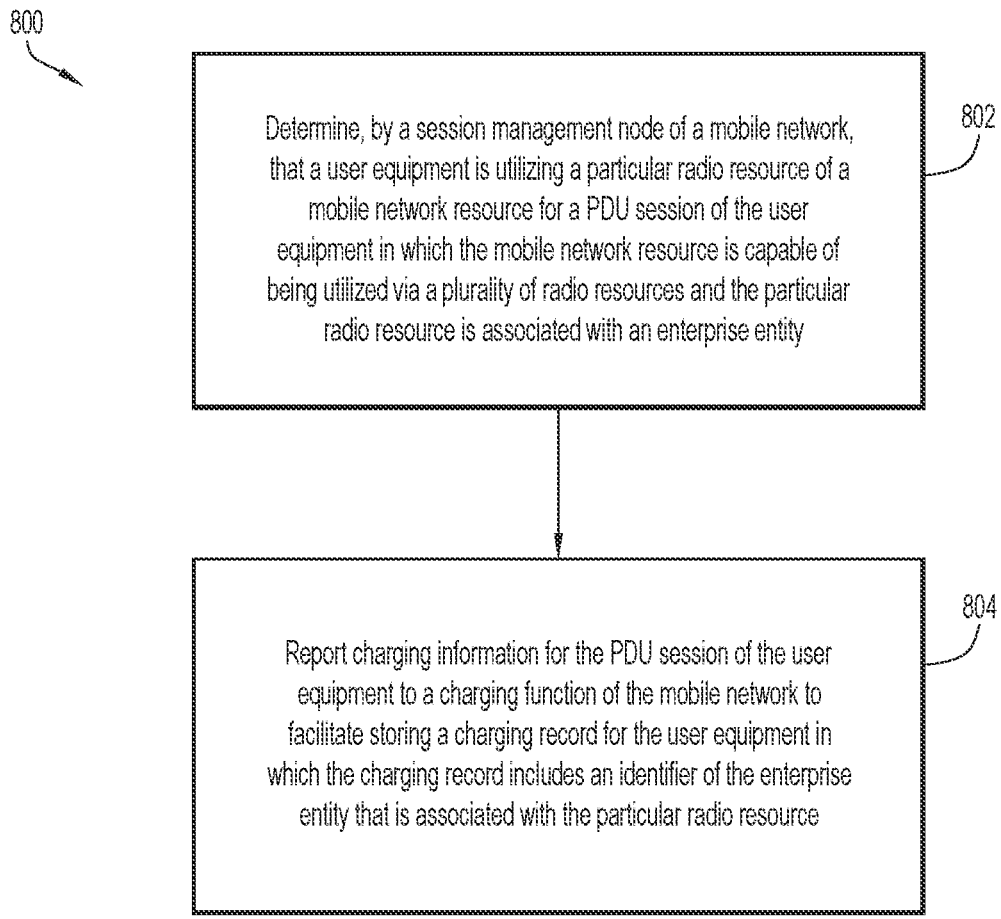
FIG. 8 is a flow chart depicting a method according to an example embodiment.

Referring to FIG. 8, FIG. 8 is a flow chart depicting a method 800 according to an example embodiment. In at least one embodiment, method 800 illustrates example operations that may be performed, at least in part, by a session management node, such as SMF 224-1 of FIG. 2, in order to provide radio resource ownership indicators for charging records of a charging system or function, according to an example embodiment.

At 802, the method can include determining, by a session management node of a mobile network, that a user equipment is utilizing a particular radio resource of a mobile network resource for a PDU session of the user equipment in which the mobile network resource is capable of being utilized via a plurality of radio resources and the particular radio resources is associated with an enterprise entity. In one instance, the mobile network resource is a network slice of the mobile network that is operated by a mobile network operator that is not the enterprise entity. The particular radio resource can be at least one of a radio frequency that is associated with the enterprise entity, a radio frequency band that is associated with the enterprise entity; and a radio beam represented by a beam identifier.

At 804, the method can include reporting charging information for the PDU session of the user equipment to a charging function of the mobile network to facilitate storing a charging record for the user equipment in which the charging record includes an identifier of the enterprise entity that is associated with the particular radio resource. In various embodiments, the identifier of the enterprise entity can be any of an OID, an OUI, or an RCOI.

In one instance, the determining may include obtaining, by the session management node of the mobile network, radio usage details from a radio node of the mobile network (e.g., RAT usage details as shown at 332/334 of FIG. 3B for the first approach discussed herein reported via the RAT Usage Information IE) in which the radio usage details includes the identifier of the enterprise entity and an identifier of the particular radio resource that the user equipment is utilizing, and obtaining, by the session management node, a usage report from a user plane function of the mobile network in which the usage report includes usage details for the PDU session of the user equipment. In this instance, the radio node can be configured with a mapping that includes the identifier of the enterprise entity in association with the identifier of the particular radio resource (e.g., as shown at 302b of FIG. 3A). Further in this instance, reporting the charging information for the PDU session of the user equipment can include reporting the charging record and the identifier of the enterprise entity.

In another instance, the charging function of the mobile network can configured with a mapping that identifies the particular radio resource in association with the identifier of the enterprise entity (e.g., for the second approach discussed herein). In this instance, the determining can include obtaining, by the session management node of the mobile network, radio usage details from a radio node of the mobile network in which the radio usage details includes the identifier of the particular radio resource that the user equipment is utilizing and obtaining, by the session management node, a usage report from a user plane function of the mobile network in which the usage report includes usage details for the PDU session of the user equipment. In this instance, reporting the charging information for the PDU session of the user equipment can include reporting the charging record and the identifier of the particular radio resource.

In yet another instance (e.g., as discussed for the third approach as illustrated in FIGS. 5A-5B), the method may include obtaining, by a radio node of the mobile network, a data packet from a user equipment via the particular radio resource; providing, by the radio node of the mobile network, the identifier of the enterprise entity and an identifier of the particular radio resource in a header of a data packet; and forwarding the data packet toward a user plane function of the mobile network (e.g., as discussed at 530a, 530b, and 530c of FIG. 5B. In this instance, the determining may include obtaining, by the session management node of the mobile network, a report from the user plane function of the mobile network in which the report includes usage details for the PDU session of the user equipment, the identifier of the particular radio resource, and the identifier of the enterprise entity (e.g., as shown at 534 of FIG. 5B). Further in this instance, reporting the charging information for the PDU session of the user equipment can include reporting the usage details for the PDU session of the user equipment, the identifier of the particular radio resource, and the identifier of the enterprise entity (e.g., as shown at 536 of FIG. 5B).

Figure 9:
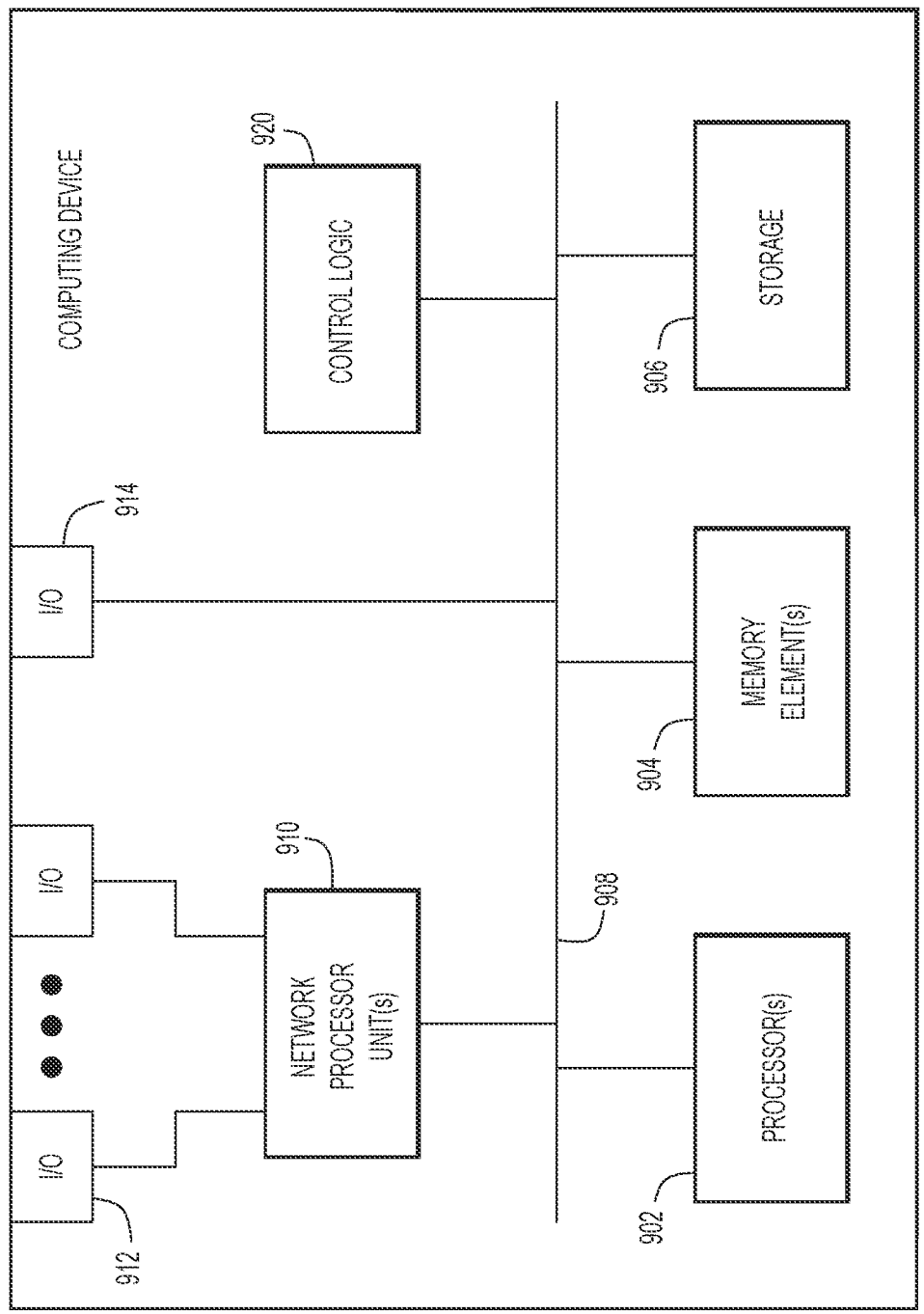
FIG. 9 is a hardware block diagram of a computing device that may perform functions associated with any combination of operations, in connection with the techniques discussed herein.

Accordingly, various features provided by embodiments herein may include, but not be limited to: facilitating the configuration of radio resource to enterprise/3rd party owner/operator mapping information (e.g., frequency band and OID mapping) on CHF 230 from an AF/NEF/OA&M; facilitating the configuration of radio resource to enterprise/ 3rd party owner/operator mapping information (e.g., frequency band and OID mapping) on the gNodeB 212 from an AF/NEF/OA&M; the PCF 226 sending PCC rules specifying an enterprise/3rd party owner/operator of radio resources for various QoS flows; the PCF 226 changing the owner/operator ID for a given QoS Flow at any time; the PCF 226 and/or the CHF 230 having suitable rating groups for charging when radio resources are owned by an enterprise/3rd-party and physical resources (e.g., Network Functions (NFs) and RAN function) are owned by an SP/MNO; the gNodeB 212 sending RAT usage details to the SMF 224-1 (via AMF 222) including radio resource and owner/operator information; the gNodeB 212 sending radio resource and owner/operator inform on the N3 interface to the UPF 232-1 in a GTP-U extension header; the gNodeB 212 sending RAT data usage details to the UPF 232-1 via UL PDU Session Information, the UPF 232-1 sending the RAT data usage to the SMF 224-1 as part of usage reports, and the CHF 230 updating charging records to include the owner/operator information for an enterprise/3rd-party based on the radio resource identified; the SMF 224-1 sending radio resource and enterprise/3rd-party owner/operator identifying information to the CHF 230; extending the PDU Session Charging Information IE of a Charging Data Request with the new RAN Resource Usage Report IE; in the SMF 224-1, a change of an enterprise/3rd-Party ID (e.g., OID) can result in chargeable events (e.g., as prescribed per 3GPP TS 32.255, Sections 5.2.1.6.1/5.2.1.6.2); in the SMF 224-1, a change of an enterprise/3rd-Party ID (e.g., OID) for a QoS Flow (e.g., 3GPP TS 32.255 5.2.3.2.2) can trigger the CHF 230 to include additional charging information in the charging record/CDR for a given user Referring to FIG. 9, FIG. 9 illustrates a hardware block diagram of a computing device 900 that may perform functions associated with operations discussed herein. In various embodiments, a computing device or apparatus, such as computing device 900 or any combination of computing devices 900, may be configured as any entity/entities as discussed herein in order to perform operations of the various techniques discussed herein, such as, for example, AMF 222, SMF 224-1, PCF 226, UDM 228, CHF 230, UPF 232-1, and/or any other network element discussed for embodiments herein.

In at least one embodiment, computing device 900 may be any apparatus that may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., hardware processor(s)) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900 (e.g., radio resource to owner/operator mappings, charging records, etc.), and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communications (wired and/or wireless) between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s), and/or antennas/antenna array(s) now known or hereafter developed. Thus, the network processor unit(s) 910 and/or network I/O interface(s) 912 may include suitable interfaces for receiving, transmitting, and/or otherwise communicating (in a wired and/or wireless manner) data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one embodiment in which computing device is implemented as a session management node (e.g., SMF 224-1), the control logic can include instructions that, when executed, cause processor(s) 902 to perform operations functions including determining that a user equipment is utilizing a particular radio resource of a mobile network resource for a PDU session of the user equipment in which the mobile network resource is capable of being utilized via a plurality of radio resources and the particular radio resources is associated with an enterprise entity; and reporting charging information for the PDU session of the user equipment to a charging function of the mobile network to facilitate storing a charging record for the user equipment, wherein the charging record includes an identifier of the enterprise entity that is associated with the particular radio resource.

Figure 10:
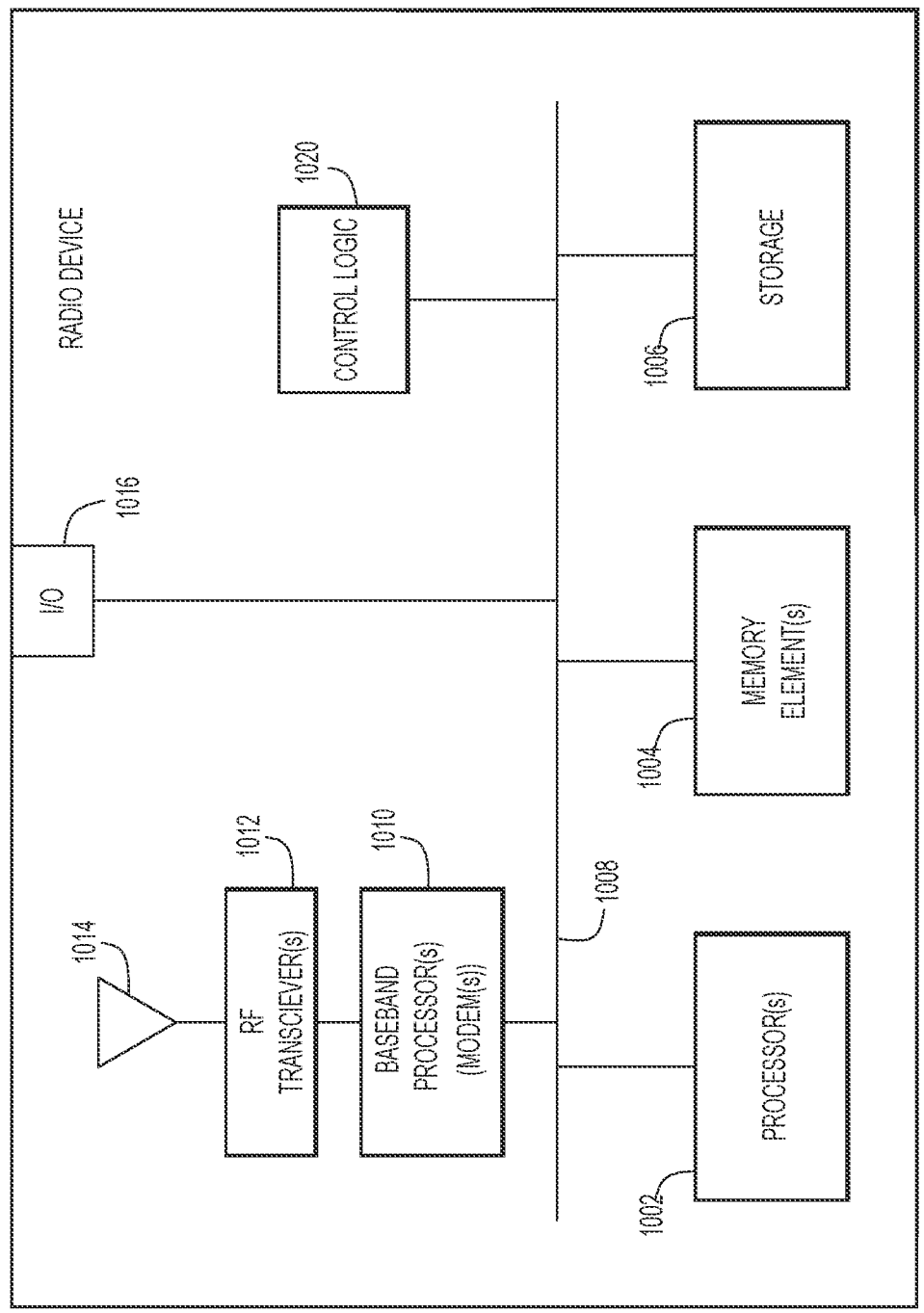
FIG. 10 is a hardware block diagram of a radio device that may perform functions associated with any combination of operations, in connection with the techniques discussed herein.

Referring to FIG. 10, FIG. 10 illustrates a hardware block diagram of a radio device 1000 that may perform functions associated with operations discussed herein. In various embodiments, a radio device or apparatus, such as radio device 1000 or any combination of radio devices 1000, may be configured as any radio node/nodes as depicted herein in order to perform operations of the various techniques discussed herein, such as operations that may be performed by gNodeB 212, according to an example embodiment.

In at least one embodiment, radio device 1000 may be any apparatus that may include one or more processor(s) 1002, one or more memory element(s) 1004, storage 1006, a bus 1008, a baseband processor or modem 1010, one or more radio RF transceiver(s) 1012, one or more antennas or antenna arrays 1014, one or more I/O interface(s) 1016, and control logic 1020.

The one or more processor(s) 1002, one or more memory element(s) 1004, storage 1006, bus 1008, and I/O interface(s) 1016 may be configured/implemented in any manner described herein, such as described herein at least with reference to FIG. 9.

The RF transceiver(s) 1012 may perform RF transmission and RF reception of wireless signals via antenna(s)/antenna array(s) 1014, and the baseband processor (modem) 1010 performs baseband modulation and demodulation, etc. associated with such signals to enable wireless communications for radio device 1000.

In various embodiments, control logic 1020, can include instructions that, when executed, cause processor(s) 1002 to perform operations, which can include, but not be limited to, providing overall control operations of radio device 1000; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920 of computing device 900 and/or control logic 1020 of radio device 1000) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 904 of computing device 900 and memory element(s) 1004 of radio device 1000) and/or storage (e.g., storage 906 of computing device 900 and storage 1006 of radio device 1000) can store data, software, code, instructions (e.g., processor instructions), logic, parameters, combinations thereof, and/or the like used for operations described herein. This includes memory element(s) 904/1004 and/or storage 906/1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include determining, by a session management node of a mobile network, that a user equipment is utilizing a particular radio resource of a mobile network resource for a Protocol Data Unit (PDU) session of the user equipment, wherein the mobile network resource is capable of being utilized via a plurality of radio resources and the particular radio resources is associated with an enterprise entity; and reporting charging information for the PDU session of the user equipment to a charging function of the mobile network to facilitate storing a charging record for the user equipment that is to include an identifier of the enterprise entity that is associated with the particular radio resource.

In various instances, the identifier of the enterprise entity is one of a Third Generation Partnership Project (3 GPP) Object Identifier (OID); an Organizationally Unique Identifier (OUI); or a Roaming Consortium Organizational Identifier (RCOI).

In at least one instance, the mobile network resource is a network slice of the mobile network that is operated by a mobile network operator that is not the enterprise entity. In one instance, the particular radio resource is at least one of a radio frequency that is associated with the enterprise entity; a radio frequency band that is associated with the enterprise entity; and a radio beam represented by a beam identifier.

In one instance, the determining includes obtaining, by the session management node of the mobile network, radio usage details from a radio node of the mobile network, the radio usage details comprising the identifier of the enterprise entity and an identifier of the particular radio resource that the user equipment is utilizing, wherein the radio node is configured with a mapping that includes the identifier of the enterprise entity in association with the identifier of the particular radio resource; and obtaining, by the session management node, a usage report from a user plane function of the mobile network, the usage report comprising usage details for the PDU session of the user equipment. In such an instance, reporting the charging information for the PDU session of the user equipment includes reporting the charging record and the identifier of the enterprise entity.

In one instance, the charging function of the mobile network is configured with a mapping that identifies the particular radio resource in association with the identifier of the enterprise entity. For such an instance, the determining includes obtaining, by the session management node of the mobile network, radio usage details from a radio node of the mobile network, the radio usage details comprising the identifier of the particular radio resource that the user equipment is utilizing; and obtaining, by the session management node, a usage report from a user plane function of the mobile network, the usage report comprising usage details for the PDU session of the user equipment. Further for such an instance, reporting the charging information for the PDU session of the user equipment includes reporting the charging record and the identifier of the particular radio resource.

In one instance, the method may include obtaining, by a radio node of the mobile network, a data packet from the user equipment via the particular radio resource; providing, by the radio node of the mobile network, the identifier of the enterprise entity and an identifier of the particular radio resource in a header of the data packet; and forwarding the data packet toward a user plane function of the mobile network. For such an instance, the determining includes obtaining, by the session management node of the mobile network, a report from the user plane function of the mobile network, the report comprising usage details for the PDU session of the user equipment, the identifier of the particular radio resource, and the identifier of the enterprise entity. Further for such an instance, reporting the charging information for the PDU session of the user equipment includes reporting the usage details for the PDU session of the user equipment, the identifier of the particular radio resource, and the identifier of the enterprise entity.

In various instances, the session management node may be a 3GPP Session Management Function (SMF).

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
determining, by a session management node of a mobile network, that a user equipment is utilizing a particular radio resource of a mobile network resource for a Protocol Data Unit (PDU) session of the user equipment, wherein the mobile network resource is capable of being utilized via a plurality of radio resources and the particular radio resource is associated with an enterprise entity and the determining is based, at least in part, on radio usage details from a radio node of the mobile network, the radio usage details comprising an identifier of the particular radio resource that the user equipment is utilizing and based on a report from a user plane function of the mobile network, the report comprising usage details for the PDU session of the user equipment, wherein the mobile network resource is a network slice of the mobile network that is operated by a mobile network operator that is not the enterprise entity; and
reporting, for the PDU session of the user equipment, charging information that includes a charging record and one of the identifier for the enterprise entity or the identifier of the particular radio resource to a charging function of the mobile network to facilitate storing the charging record for the user equipment that is to include the identifier of the enterprise entity that is associated with the particular radio resource.

2. The method of claim 1, wherein the particular radio resource is at least one of:
a radio frequency that is associated with the enterprise entity;
a radio frequency band that is associated with the enterprise entity; and
a radio beam represented by a beam identifier.

3. The method of claim 1,
the radio usage details further comprising the identifier of the enterprise entity, wherein the radio node is configured with a mapping that includes the identifier of the enterprise entity in association with the identifier of the particular radio resource.

4. The method of claim 3, wherein the charging information includes the identifier of the enterprise entity.

5. The method of claim 1, wherein the charging function of the mobile network is configured with a mapping that identifies the particular radio resource in association with the identifier of the enterprise entity.

6. The method of claim 5, wherein the charging information includes the identifier of the particular radio resource.

7. The method of claim 1, wherein the identifier of the enterprise entity is one of:

a Third Generation Partnership Project (3GPP) Object Identifier (OID);

an Organizationally Unique Identifier (OUI); or a Roaming Consortium Organizational Identifier (RCOI).

8. One or more non-transitory computer readable storage media encoded with instructions that, when executed by a processor, cause the processor to perform operations, comprising:

determining, by a session management node of a mobile network, that a user equipment is utilizing a particular radio resource of a mobile network resource for a Protocol Data Unit (PDU) session of the user equipment, wherein the mobile network resource is capable of being utilized via a plurality of radio resources and the particular radio resource is associated with an enterprise entity and the determining is based, at least in part, on radio usage details from a radio node of the mobile network, the radio usage details comprising an identifier of the particular radio resource that the user equipment is utilizing and based on a report from a user plane function of the mobile network, the report comprising usage details for the PDU session of the user equipment, wherein the mobile network resource is a network slice of the mobile network that is operated by a mobile network operator that is not the enterprise entity; and reporting, for the PDU session of the user equipment, charging information that includes a charging record and one of the identifier for the enterprise entity or the identifier of the particular radio resource to a charging function of the mobile network to facilitate storing the charging record for the user equipment that is to include the identifier of the enterprise entity that is associated with the particular radio resource.

9. The media of claim 8, wherein the identifier of the enterprise entity is one of:

a Third Generation Partnership Project (3GPP) Object Identifier (OID);

an Organizationally Unique Identifier (OUI); or a Roaming Consortium Organizational Identifier (RCOI).

10. The media of claim 8, wherein the particular radio resource is at least one of:

a radio frequency that is associated with the enterprise entity;

a radio frequency band that is associated with the enterprise entity; and a radio beam represented by a beam identifier.

11. The media of claim 8, the radio usage details further comprising the identifier of the enterprise entity, wherein the radio node is configured with a mapping that includes the identifier of the enterprise entity in association with the identifier of the particular radio resource and the charging information includes the identifier of the enterprise entity.

12. The media of claim 8, wherein the charging information includes the identifier of the particular radio resource and the charging function of the mobile network is configured with a mapping that identifies the particular radio resource in association with the identifier of the enterprise entity.

13. A session management node of a mobile network comprising:

at least one memory element for storing data; and at least one processor for executing instructions associated with the data, wherein executing the instructions causes the session management node to perform operations, comprising:

determining that a user equipment is utilizing a particular radio resource of a mobile network resource for a Protocol Data Unit (PDU) session of the user equipment, wherein the mobile network resource is capable of being utilized via a plurality of radio resources and the particular radio resource is associated with an enterprise entity and the determining is based, at least in part, on radio usage details from a radio node of the mobile network, the radio usage details comprising an identifier of the particular radio resource that the user equipment is utilizing and based on a report from a user plane function of the mobile network, the report comprising usage details for the PDU session of the user equipment, wherein the mobile network resource is a network slice of the mobile network that is operated by a mobile network operator that is not the enterprise entity; and reporting, for the PDU session of the user equipment, charging information that includes a charging record and one of the identifier for the enterprise entity or the identifier of the particular radio resource to a charging function of the mobile network to facilitate storing the charging record for the user equipment that is to include the identifier of the enterprise entity that is associated with the particular radio resource.

14. The session management node of claim 13, wherein the particular radio resource is at least one of:

a radio frequency that is associated with the enterprise entity;

a radio frequency band that is associated with the enterprise entity; and a radio beam represented by a beam identifier.

15. The session management node of claim 13, wherein the identifier of the enterprise entity is one of:

a Third Generation Partnership Project (3GPP) Object Identifier (OID);

an Organizationally Unique Identifier (OUI); or a Roaming Consortium Organizational Identifier (RCOI).

16. The session management node of claim 13, wherein the session management node is a Third Generation Partnership Project (3GPP) Session Management Function (SMF).

17. The session management node of claim 13, the radio usage details further comprising the identifier of the enterprise entity, wherein the radio node is configured with a mapping that includes the identifier of the enterprise entity in association with the identifier of the particular radio resource.

18. The session management node of claim 17, wherein the charging information includes the identifier of the enterprise entity.

19. The session management node of claim 13, wherein the charging information includes the identifier of the particular radio resource and the charging function of the mobile network is configured with a mapping that identifies the particular radio resource in association with the identifier of the enterprise entity.

* * * * *